United States Patent
Zanella et al.

(10) Patent No.: US 10,753,412 B2
(45) Date of Patent: Aug. 25, 2020

(54) BICYCLE BRAKE DISC ASSEMBLY

(71) Applicant: Campagnolo S.r.l., Vicenza (IT)

(72) Inventors: Nicola Zanella, Venice (IT); Flavio Fusari, Creazzo (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 15/964,667

(22) Filed: Apr. 27, 2018

(65) Prior Publication Data

US 2018/0320745 A1 Nov. 8, 2018

(30) Foreign Application Priority Data

May 2, 2017 (IT) .......................... 102017000046888

(51) Int. Cl.
| | |
|---|---|
| *F16D 65/12* | (2006.01) |
| *B62L 1/00* | (2006.01) |
| *B60B 27/02* | (2006.01) |
| *B60B 27/00* | (2006.01) |
| *F16D 65/02* | (2006.01) |
| *F16D 69/00* | (2006.01) |

(52) U.S. Cl.
CPC ........ *F16D 65/123* (2013.01); *B60B 27/0052* (2013.01); *B60B 27/023* (2013.01); *B62L 1/005* (2013.01); *F16D 2065/1316* (2013.01); *F16D 2065/1356* (2013.01); *F16D 2065/1384* (2013.01); *F16D 2069/004* (2013.01); *F16D 2250/0084* (2013.01)

(58) Field of Classification Search
CPC ........... F16D 65/123; F16D 2065/1316; F16D 2065/1356; F16D 2065/1384; F16D 2069/004
See application file for complete search history.

(56) References Cited

U.S. PATENT DOCUMENTS

| | | | | |
|---|---|---|---|---|
| 6,206,144 | B1 * | 3/2001 | Di Bella | ................... B62L 1/00 |
| | | | | 188/26 |
| 6,244,405 | B1 * | 6/2001 | Chen | ................... B60B 27/0005 |
| | | | | 192/64 |
| 6,371,252 | B1 * | 4/2002 | Kanehisa | ................ F16D 65/12 |
| | | | | 188/26 |

(Continued)

FOREIGN PATENT DOCUMENTS

| | | |
|---|---|---|
| CN | 204110000 U | 1/2015 |
| EP | 1847452 A2 | 10/2007 |
| WO | 03/002886 A1 | 1/2003 |

OTHER PUBLICATIONS

Italian Search Report and Written Opinion in Italian Application No. 102017000046888, dated Dec. 22, 2017, with English translation.

*Primary Examiner* — Bradley T King
*Assistant Examiner* — James K Hsiao
(74) *Attorney, Agent, or Firm* — Volpe and Koenig, P.C.

(57) ABSTRACT

A bicycle brake disc assembly has a brake disc and a hub body that has a portion for connection to the brake disc. The hub body includes a radially outer portion provided with a plurality of stops arranged at different axial distances from an axial end of the hub body. The brake disc includes a central portion provided with an opening for at least partially receiving the connection portion of the hub body and for securing the brake disc to the hub body. The brake disc also has a protuberance configured to selectively contact one of said stops of the hub body.

17 Claims, 12 Drawing Sheets

(56) References Cited

U.S. PATENT DOCUMENTS

| | | | |
|---|---|---|---|
| 6,571,920 B1* | 6/2003 | Sturmer | B60B 27/023 188/26 |
| 6,994,189 B2* | 2/2006 | Chen | B60B 27/023 188/17 |
| 7,367,632 B2* | 5/2008 | Chang | B60B 27/0052 188/24.11 |
| 7,475,758 B2* | 1/2009 | Dimsey | F16D 65/12 188/17 |
| 7,665,584 B2* | 2/2010 | Hirotomi | B60B 27/0052 188/18 A |
| 9,267,560 B2 | 2/2016 | Nakakura | |
| 10,357,996 B2* | 7/2019 | Kittrell, Jr. | F16D 65/12 |
| 2006/0081425 A1 | 4/2006 | Chen | |
| 2006/0219488 A1* | 10/2006 | Chen | B62L 1/005 188/26 |
| 2013/0153344 A1* | 6/2013 | Morio | F16D 65/12 188/218 XL |
| 2014/0124308 A1* | 5/2014 | Kim | F16D 65/123 188/218 XL |
| 2015/0034430 A1* | 2/2015 | Nakakura | F16D 65/12 188/218 XL |
| 2015/0345577 A1 | 12/2015 | Watarai | |
| 2017/0030423 A1* | 2/2017 | Comenduli | F16D 65/123 |
| 2017/0074336 A1* | 3/2017 | Burgoon | F16D 65/123 |
| 2017/0096029 A1* | 4/2017 | Fujita | B60B 27/0026 |
| 2018/0345723 A1* | 12/2018 | Fujita | B60B 27/0026 |

\* cited by examiner

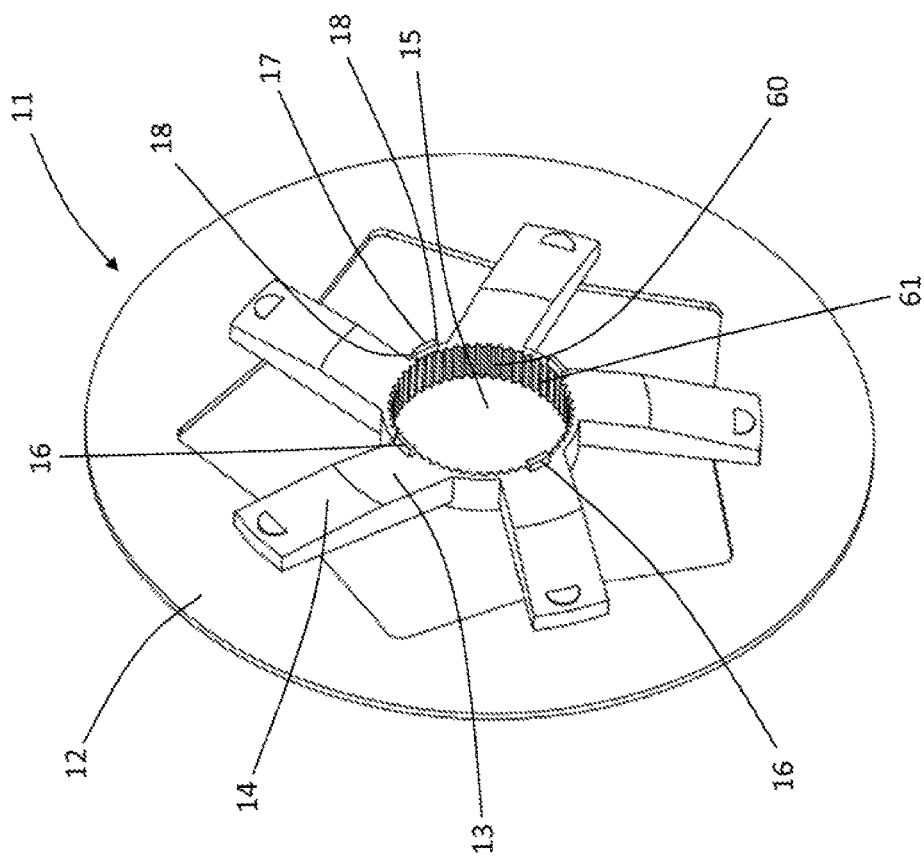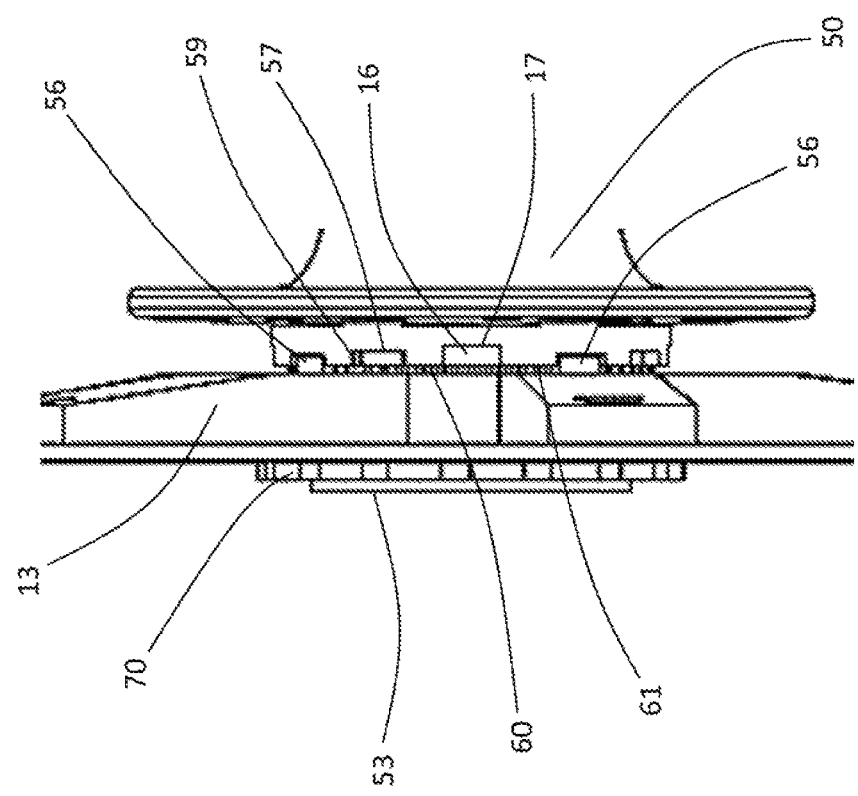

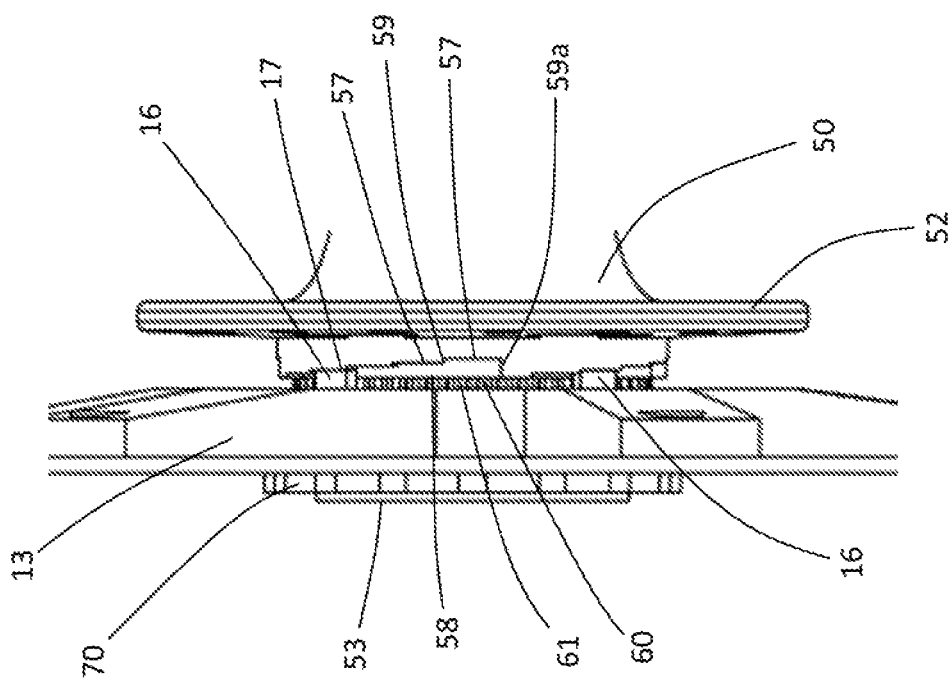
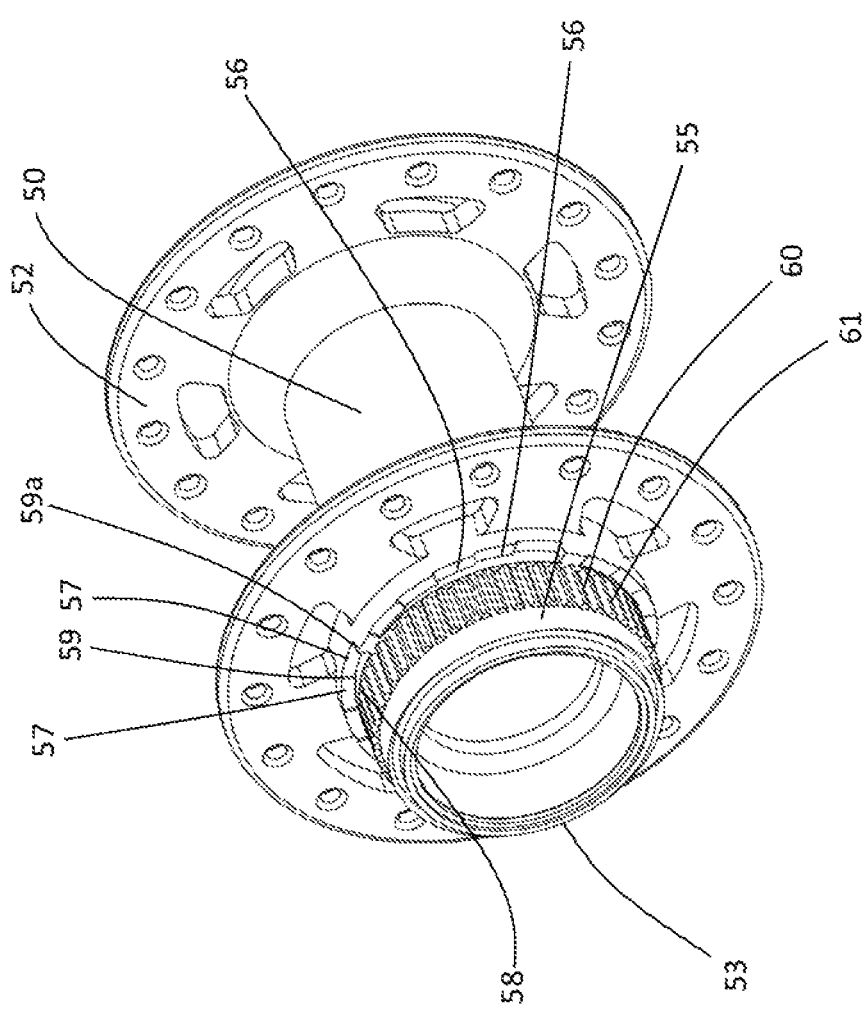

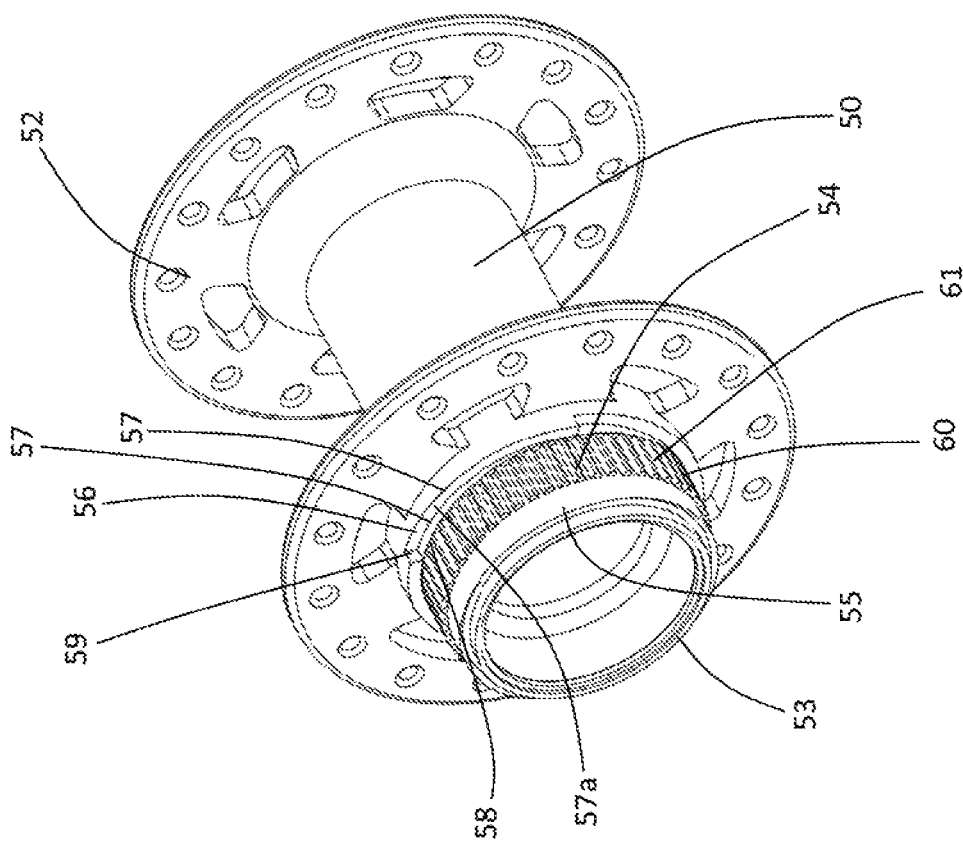
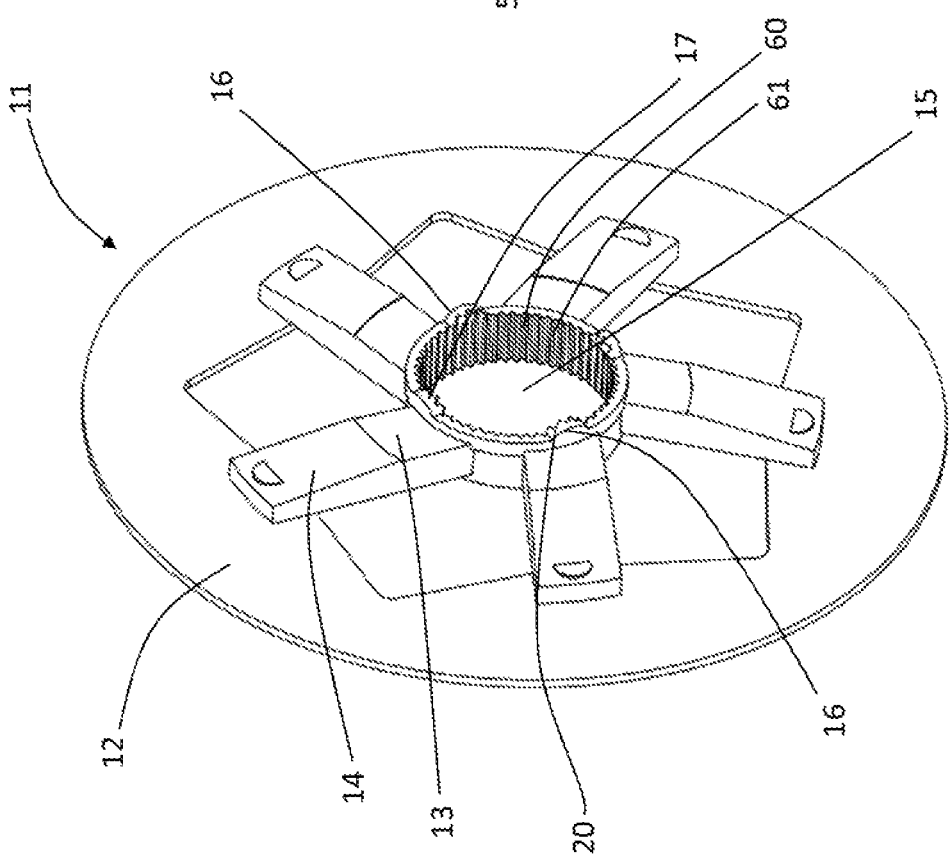

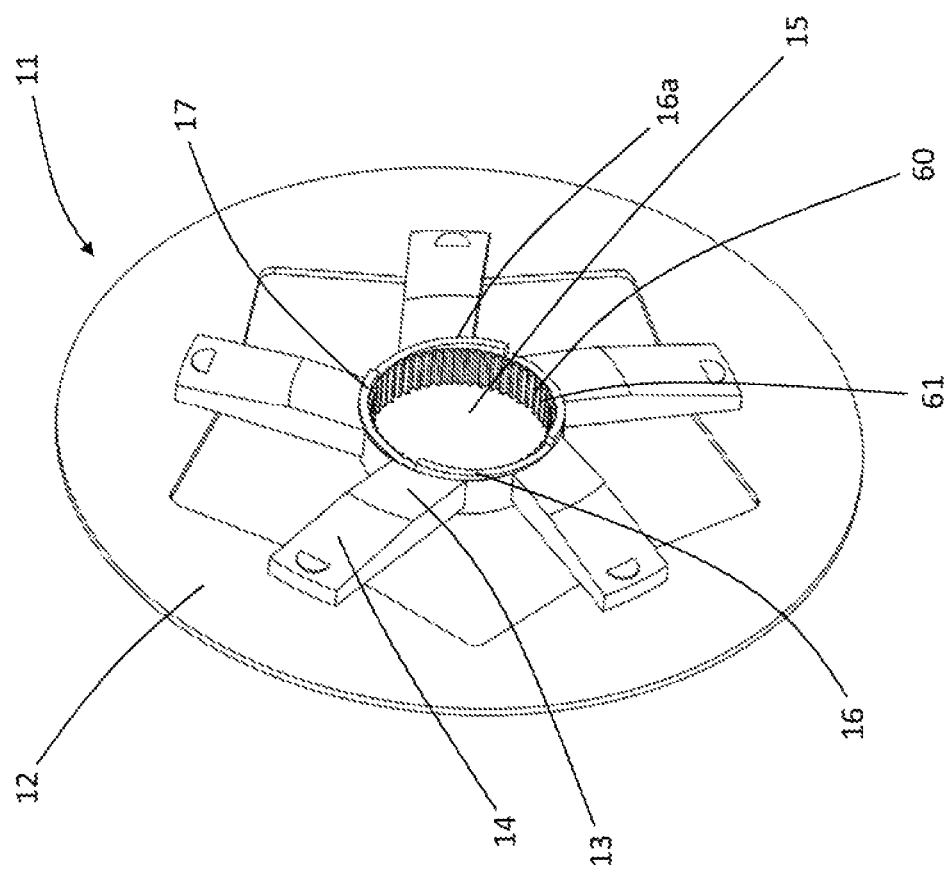
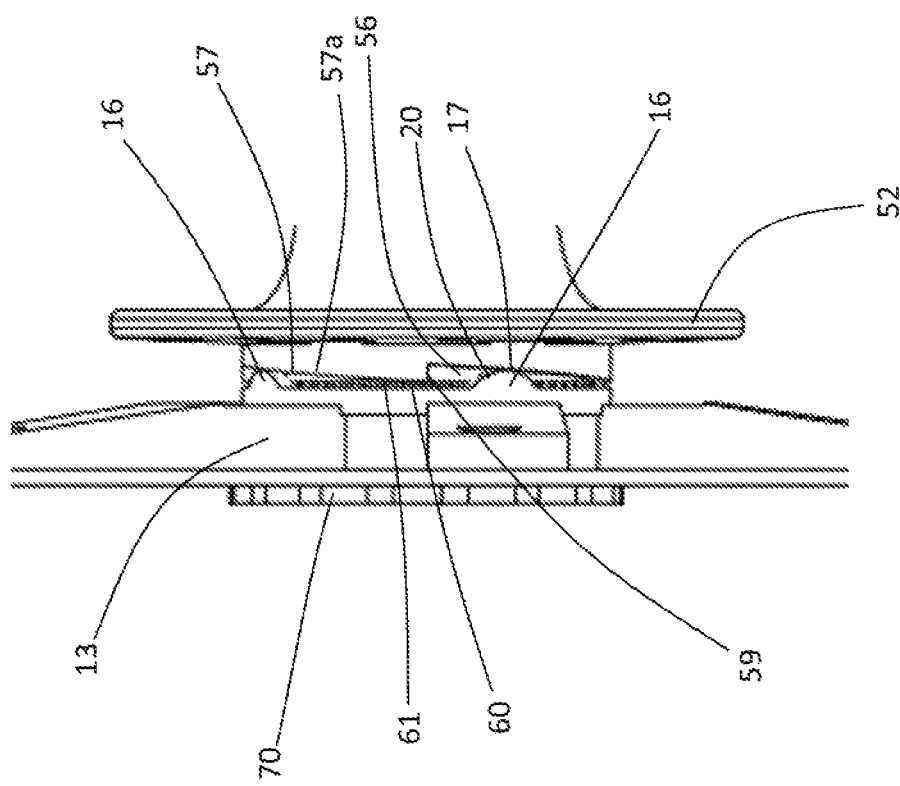

BICYCLE BRAKE DISC ASSEMBLY

CROSS REFERENCE TO RELATED APPLICATION

This application claims the benefit of Italian Application No. 102017000046888, filed on May 2, 2017, which is incorporated herein by reference as if fully set forth.

FIELD OF INVENTION

The present invention relates to a bicycle brake disc assembly.

BACKGROUND

As known, it is now common in bicycles to use disc brakes. Such brakes are indeed often preferred to other kinds of conventional brakes because they ensure a high braking force and they are less subject to problems caused by debris, such as mud or water.

Typically, a disc brake comprises a brake caliper fixed on the frame of the bicycle and a brake disc assembly comprising a brake disc mounted on a hub of a wheel. Inside the brake caliper there are two or four opposite brake pads. The brake disc rotates inside the space defined between the opposite pads. By actuating the brake lever, the pads are brought towards the brake disc, generating friction on the brake disc.

The coupling of the brake disc with the hub has the function of transferring the forces generated between the brake pads and the brake disc to the hub, so as to create a resistant torque on the hub of the wheel and obtain braking.

For this purpose, the brake disc is locked on the hub by bolts or by a shape fitting between the outer surface of the hub and the inner surface of a hole in the central portion of the brake disc.

In order to ensure that the brake disc is arranged between the space available between the pads of the brake caliper, the latter is provided with adjusters that allow an axial displacement of the caliper body with respect to the frame of the bicycle (and thus with respect to the brake disc).

In the case in which it is necessary to replace the wheel of the bicycle or to replace the brake disc, it is necessary to act on the adjusters of the brake caliper to ensure the centering of the brake disc between the pads.

Indeed, the machining tolerances and above all the clearances created in the mounting step of the brake disc on the hub are such that two nominally identical wheels have slight differences in the axial position of the brake disc with respect to a fixed reference (the frame of the bicycle).

Such slight differences in the axial position of the brake disc require action on the adjusters of the brake caliper to center the brake disc between the pads.

The Applicant has noted that the necessary adjustment of the adjusters of the brake caliper involves a time to change the wheel that is incompatible, for example, with the requirements of speed of wheel change during a cycling race.

The Applicant has further noted that the prolonged and continuous actuation of the adjusters of the brake caliper, especially if carried out by non-experts, can cause them to be damaged and consequently malfunction.

Document U.S. Pat. No. 9,267,560 B2 describes a bicycle brake disc assembly comprising a mechanism for adjusting the axial position of the brake disc with respect to the hub. The adjustment mechanism comprises an elastic element, such as a spring, active between the brake disc and the hub of the wheel. The brake disc is locked in a predetermined axial position by locking members, active on the hub and on the brake disc, counteracting the action of the elastic element. By selecting the axial position in which to activate the locking members it is possible to select the axial position of the brake disc.

The Applicant has perceived that it would be advantageous to have a simple and cost-effective brake disc assembly allowing a wheel change without having to intervene on the adjusters of the brake caliper.

SUMMARY

The present invention therefore relates to a bicycle brake disc assembly comprising a brake disc and a hub body comprising a connection portion to said brake disc, wherein said hub body comprises a radially outer portion provided with a plurality of stop areas arranged at different axial distances from an axial end of the hub body, said brake disc comprising a central portion provided with an opening for at least partially receiving said connection portion of the hub body and for securing in rotation said brake disc to said hub body, said brake disc further comprising a protuberance configured to selectively contact one of said stop areas of the hub body.

The hub body connects the hub to the rim of the wheel (for example through spokes) and is crossed by a hub pin that defines a hub axis that is secured to the frame (or to the fork) of the bicycle.

The Applicant has perceived that by providing the hub body with a plurality of stop areas and by providing the brake disc with at least one protuberance, it is possible to insert the brake disc on the hub body so that the protuberance contacts one of the stop areas.

In this way, the brake disc assumes a predetermined axial position with respect to the hub body.

The Applicant has further perceived that by differentiating the stop areas in terms of axial positioning, namely in terms of axial distance from a fixed reference like for example the axial end of the hub body, it is possible to select the stop area that the protuberance of the brake disc must engage, making it possible to select the axial position of the brake disc with respect to the hub body.

In this way, on each occasion it is possible to select the stop area that the protuberance of the brake disc must engage to allow the brake disc to rotate freely in the space between the pads of the brake caliper.

The selection of the stop area to be engaged with the protuberance of the brake disc can for example be carried out by trial and error until the most suitable stop area is identified that allows a free rotation of the brake disc between the pads of the brake caliper.

The Applicant has perceived that in this way it is possible to provide a set of wheels already provided with a brake disc that can immediately replace the wheel already mounted without it being necessary to intervene on the adjusters of the brake caliper.

The engagement of the protuberance in a stop area is univocal; once a stop area to be engaged has been selected it is sufficient to position the brake disc with respect to the hub body so as to align the protuberance with the stop area without needing to use special tools and equipment and without requiring particular experience and sensitivity of the operator.

This also allows users who are not specialized mechanics to be able to assemble the brake disc assembly in a precise and effective manner.

The Applicant has further perceived that the absence of additional parts or components to be inserted between the brake disc and the hub body to define an axial position of the brake disc with respect to the hub body makes it possible to reduce the mounting errors and, consequently, to increase the reliability of the brake disc assembly.

BRIEF DESCRIPTION OF THE DRAWINGS

The features and advantages of the invention will be highlighted more clearly by the description of some preferred embodiments, made with reference to the attached drawings, in which:

FIG. 10 is a schematic view of the brake disc assembly of the third embodiment;

FIG. 11 is a schematic perspective view of a brake disc of a fourth embodiment of a brake disc assembly in accordance with the present invention;

FIG. 12 is a schematic perspective view of a hub body of the fourth embodiment;

FIG. 13 is a schematic view of the brake disc assembly of the fourth embodiment;

FIG. 14 is a schematic perspective view of a brake disc of a fifth embodiment of a brake disc assembly in accordance with the present invention;

FIG. 15 is a schematic perspective view of a hub body of the fifth embodiment;

FIG. 16 is a schematic view of the brake disc assembly of the fifth embodiment;

FIG. 17 is a schematic perspective view of a brake disc of a sixth embodiment of a brake disc assembly in accordance with the present invention;

DETAILED DESCRIPTION OF THE PREFERRED EMBODIMENTS

Figure 1:
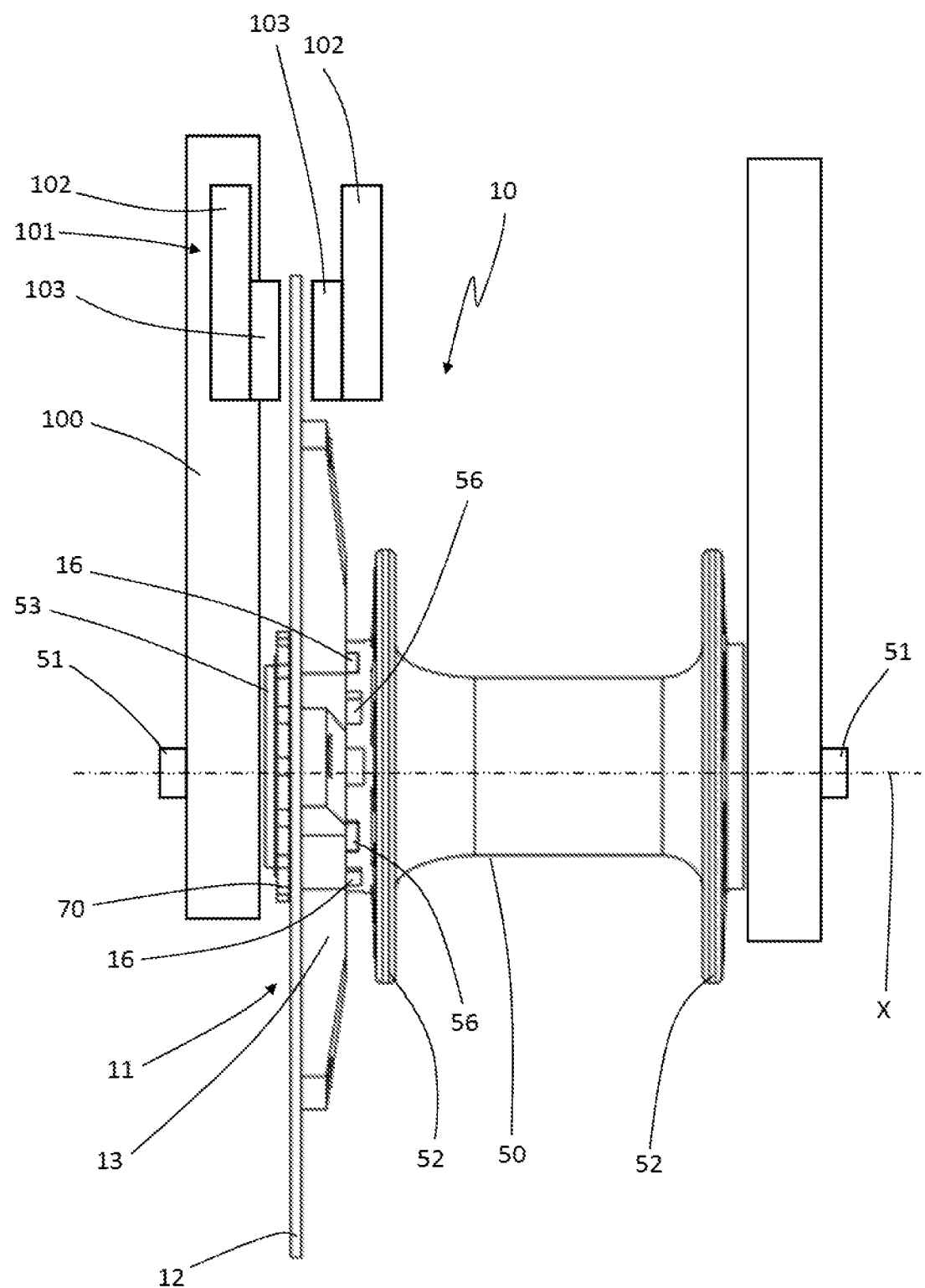
FIG. 1 is a schematic view of a bicycle brake disc assembly in accordance with the present invention.
Figure 3:
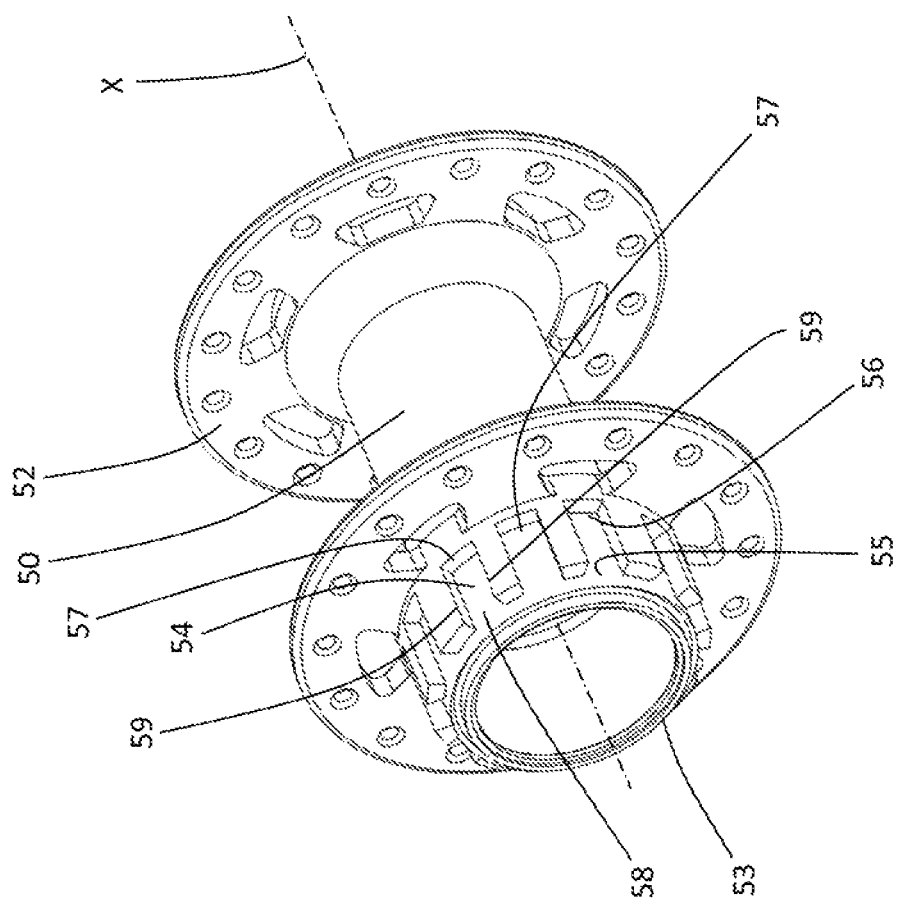
FIG. 3 is a schematic perspective view of a hub body of the first embodiment.

In the present description and in the following claims, the terms "axial", "axially" and similar refer to a direction substantially coinciding with or parallel to a rotation axis of the hub body, the terms "axially inner" and "axially outer" respectively refer to an axial direction directed towards or away from a middle plane of the hub body perpendicular to the rotation axis of the hub body; the term "radial", "radially" and similar refer to a direction that lies in a plane substantially orthogonal to the rotation axis of the hub body and that passes through such a rotation axis, the terms "radially inner" and "radially outer" respectively refer to a radial direction directed towards or away from the rotation axis of the hub body; the terms "circumferential", "circumferentially" and similar refer to a direction coinciding with or parallel to a direction of rotation of the hub body.

The bicycle brake disc assembly according to the present invention can comprise one or more of the following features considered singularly or in combination with each other.

Preferably, said brake disc comprises a plurality of protuberances circumferentially aligned and equally spaced and wherein said hub body comprises a plurality of stop areas for each protuberance, said stop areas being circumferentially aligned.

Preferably, for each protuberance a respective plurality of stop areas is defined that can be engaged by the protuberance itself.

In this way, the axial position of the brake disc with respect to the hub body is defined by the engagement of many protuberances in respective stop areas, increasing the stability of the axial position taken up by the brake disc with respect to the hub body.

Furthermore, by providing at least three protuberances it is possible to also ensure an excellent perpendicular relationship between the brake disc and the hub body.

Preferably, the angular distance between two identical stop areas belonging to two pluralities of circumferentially adjacent stop areas is equal to the angular distance between two circumferentially adjacent protuberances.

In this way, it is sufficient to align a single protuberance with the preselected stop area to ensure that the other protuberances will also be engaged in the correct stop area.

Preferably, said protuberances have identical dimensions in the axial direction.

Preferably, said protuberances have identical dimensions in the circumferential direction.

Preferably, the difference between the distance between the axially outermost stop area and the axially innermost stop area of a same plurality of stop areas is comprised between about 0.025 mm and about 2.000 mm.

In this way it is possible to change the angular position of the brake disc with respect to the hub body with precision and accuracy.

Preferably, each stop area comprises an insertion opening for said protuberance, at least one shoulder directed axially and a stop wall configured to be contacted by the protuberance of the brake disc.

In this way, the insertion of the protuberance in the stop area is completed when the protuberance contacts the stop wall.

The stop wall further makes it possible to block displacements directed in the axially inner direction of the brake disc with respect to the hub body.

The shoulder has the function of accompanying, at least in part, the insertion of the protuberance in the stop area.

In some preferred embodiments of the invention, each stop area comprises two shoulders that extend between said insertion opening and said stop wall, said two shoulders being parallel to one another and circumferentially spaced by a distance equal to the circumferential extension of the protuberance configured to engage the stop area.

In this way, the two shoulders act as guides for the insertion of the protuberance in the stop area, allowing the protuberances to reach the stop walls of the respective stop areas in a guided and univocal manner.

In some embodiments of the invention, the stop areas are preferably circumferentially separated from the shoulders, so that each stop area does not communicate with the circumferentially adjacent stop area.

Preferably, the stop walls of each stop area of a same plurality of stop areas are arranged along different circumferential planes that are parallel to one another.

In other words, each stop area comprises a stop wall that is preferably flat and perpendicular to the hub axis wherein the stop walls of stop areas of a same plurality of stop areas (selectively engageable by a protuberance) are axially spaced from one another.

In some embodiments of the invention, said protuberances of the brake disc project radially inside said opening of the central portion; said shoulders extending axially for a distance at least equal to the axial dimension of the central portion of the brake disc.

In other words, the shoulders of the stop areas pass through the opening of the central portion of the brake disc with the protuberances inserted snugly between two shoulders.

In this way, the engagement of the protuberances in the stop areas rotatably couples the hub body with the brake disc, making the brake disc and the hub body rotate as a unit and allowing the transmission of brake torques between the brake disc and the hub body.

In some embodiments of the invention, said protuberances are preferably arranged radially outside of said opening of the central portion.

In these embodiments of the invention, said hub body comprises a plurality of protrusions interspersed with a plurality of grooves that extend axially outside and radially inside of said stop areas; said opening of the central portion of the brake disc comprising a plurality of protrusions and of grooves matching said plurality of protrusions and of grooves of said hub body.

The hub body is inserted in the opening of the central portion of the brake disc so that the grooves of the hub body receive the protrusions of the brake disc and so that the grooves of the brake disc receive the protrusions of the hub body.

In this way, the hub body and the disc rotate as a unit and it is possible to transfer braking torques between the brake disc and the hub body.

In some embodiments of the invention, the stop areas of a same plurality of stop areas preferably comprise a single shoulder and are not physically separate in the circumferential direction.

Also in this case, the stop walls of each stop area of a same plurality of stop areas are preferably arranged along different circumferential planes that are parallel to one another.

In these embodiments, the stop areas of a same plurality of stop areas form a stepped surface.

In some embodiments of the invention, the stop walls of each stop area of a same plurality of stop areas are preferably arranged in succession forming a single inclined plane.

In this case, the stop areas of a same plurality of stop areas are not physically separate in the circumferential direction.

In this way, the stop areas form a single inclined plane, delimited by a shoulder, which allows a practically continuous, namely not discrete, variation of the axial positions that the brake disc can assume with respect to the hub body.

In some embodiments of the invention, preferably, the protuberances of the brake disc comprise an axial end counter-shaped with respect to the single inclined plane defined by the stop walls of each stop area of a same plurality of stop areas.

In this way, the stop areas and the protuberance form two inclined surfaces that, depending on the mutual angular orientation, take the brake disc axially towards or away from a fixed reference with continuity, namely in a non-discrete manner.

In some preferred embodiments of the invention the protuberances project axially from said central portion of the brake disc towards said plurality of stop areas.

In some preferred embodiments of the invention, the protuberances are radially and axially contained in the central opening of the brake disc.

In order to axially lock the brake disc on the hub body and to prevent axial displacements between the protuberances and the stop areas engaged by them, the brake disc assembly preferably comprises a lock nut that can be screwed on the axial end of the hub body and can abut on the brake disc.

In a further aspect of the present invention, a bicycle hub body comprises a portion configured for the connection to a bicycle brake disc, said connection portion having a radially outer portion provided with a plurality of stop areas arranged at different axial distances from an end of the hub body, said stop areas of the hub body being configured to be selectively contacted by at least one protuberance of said brake disc.

In a yet further aspect of the present invention, a bicycle brake disc comprises a central portion provided with an opening for at least partially receiving a connection portion of a hub body and for securing in rotation said brake disc to said hub body, said brake disc further comprising at least one protuberance configured to selectively contact at least one stop area of the hub body.

With reference now to the attached figures, reference numeral 10 wholly indicates a bicycle brake disc assembly according to the present invention.

The parts of the brake disc assembly 10 shared by all of the embodiments will be indicated with the same reference numerals and should be deemed to be comprised in all of the embodiments except where explicitly otherwise indicated.

The brake disc assembly 10 comprises a brake disc 11 and a hub body 50.

As indicated in FIG. 1, the hub body 50 is crossed in the axial direction by a hub pin 51 connectable to a portion 100 of the bicycle frame, like for example a front fork or support arms of the rear wheel.

The hub body 50 is rotatable about a hub axis X of the hub pin 51 and, for this purpose, it is rotatably connected to the hub pin 51 through roller bearings (not illustrated) radially interposed between the hub body 50 and the hub pin 51.

The hub body 50 is connected to a rim of a wheel (not illustrated) by spokes or by a continuous surface (making a lenticular wheel).

In the example illustrated in the attached figures, the hub body 50 is configured to be connected to the rim of the wheel by spokes (not illustrated) that extend from two axially opposite flanges 52 of the hub body 50 to reach radially inner portions of the rim of the wheel.

The hub axis X coincides with the rotation axis of the wheel of the bicycle.

A caliper body 101 (schematized in FIG. 1) having two axially opposite brake calipers 102 and provided with respective brake pads 103 is mounted on the portion 100 of the bicycle frame, in a per se known way.

The brake disc 11 comprises a brake track 12 and a central portion 13 connected with the brake track 12.

The brake track 12 has a substantially annular extension and is intended to rotate between the brake pads 103 of the caliper body 101, as schematically indicated in FIG. 1. The brake track 12 is made of a material that ensures good braking features, like for example steel, whereas the central portion 13 can be made of a lighter material, like for example aluminum or light alloys.

The brake track 12 has a substantially uniform thickness in the axial direction, for example comprised in a range between about 1.8 mm and about 2 mm.

The brake track 12 can comprise a plurality of axial holes that pass through the entire thickness of the brake track 12 itself to better dissipate the heat generated during braking.

The brake track 12 is connected to the central portion 13 so as to be able to transmit to the latter the braking action that the brake pads 103 exert.

Figure 2:
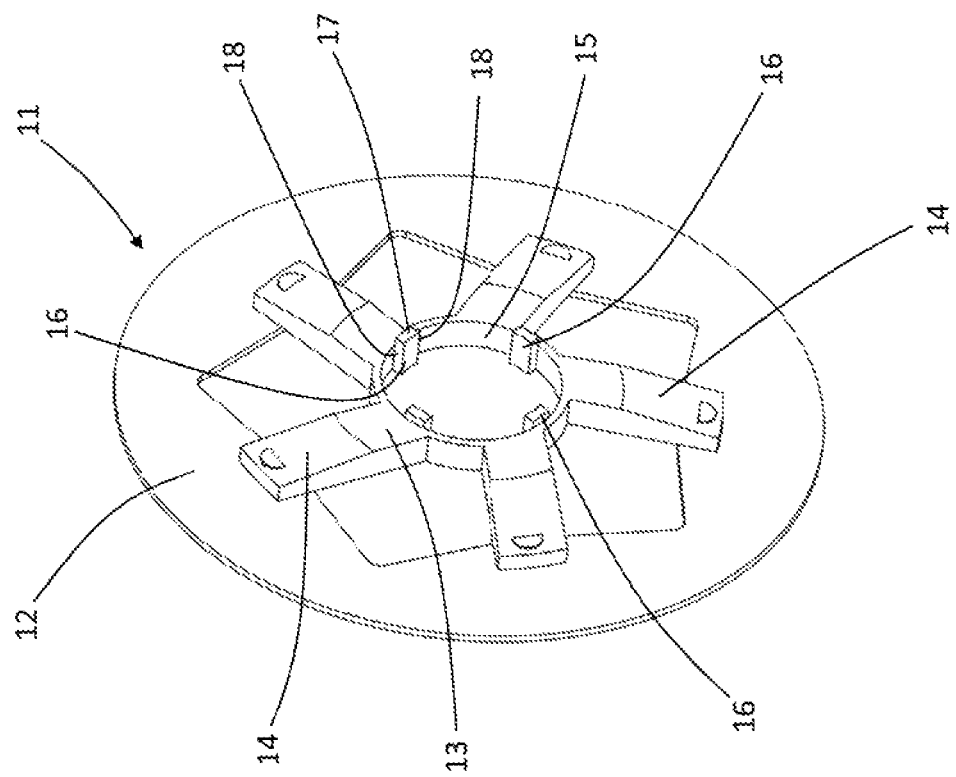
FIG. 2 is a schematic perspective view of a brake disc of a first embodiment of a brake disc assembly in accordance with the present invention.

For this purpose, the central portion 12 comprises a plurality of radial connection portions 14 connected to connection areas of the brake track 12, as for example schematically indicated in FIG. 2.

The connection between the brake track 12 and the central portion 13 can be fixed or, alternatively, can be such as to allow a radial clearance between the brake track and the central portion 13. As an example, such connection can be made through caulked pins received in respective holes formed in the radial connection portions 14 of the central portion and in the connection areas of the brake track 12.

The central portion 13 of the brake disc 11 comprises a through opening 15 intended to be crossed by an axial end 53 of the hub body 50.

In particular, the hub body 50 comprises a connection portion 54 having a free end that defines the axial end 53 of the hub body 50.

The connection portion 54 extends from an axially outer position with respect to the securing flange 52 of the spokes of the wheel up to the axial end 53 of the hub body 50.

The connection portion 54 is at least partially insertable in the opening 15 of the central portion 13 of the brake disc 11 so as to cross the entire thickness in the axial direction of the brake disc 11.

The central portion 13 of the brake disc 11 comprises a plurality of protuberances 16, preferably four protuberances 16, which extend in the axial direction.

A radially outer portion 55 of the hub body 50, arranged on the connection portion 54, comprises a plurality of stop areas 56 for the protuberances 16 of the brake disc 11.

In particular, for every protuberance 16 of the brake disc 11 a respective plurality of stop areas 56 is provided, so that many stop areas 56 are available for each protuberance 16.

When the brake disc 11 is fitted on the hub body 50, and in particular when the connection portion 54 of the hub body 50 is inserted in the opening 15 of the brake disc 11, each protuberance 16 inserts in a corresponding stop area 56.

The protuberances 16 all have the same axial extension and the stop areas 56 of a plurality of stop areas are identical to the stop areas 56 of another plurality of stop areas 56.

As schematically illustrated in the attached figures, the protuberances 16 are arranged at a same radial distance and are aligned along a circumferential direction.

The stop areas 56 are radially aligned with the protuberances 16 and are also aligned along a circumferential direction.

The stop areas 56 define the limit to the degree of insertion of the brake disc 11 on the hub body 50, defining an end of stroke stop to the sliding of the brake disc 11 in ab axially inner direction on the hub body 50.

The stop areas 56 of a same plurality of stop areas 56, namely the stop areas 56 engageable by a protuberance 16, have mutually different distances in the axial direction with respect to a fixed reference, for example with respect to the axial end 53 of the hub body 50.

Therefore, couplings of the protuberances 16 with different stop areas 56 correspond to different degrees of insertion of the brake disc 11 on the hub body 50, namely they correspond to different axial positions of the brake disc 11 with respect to the hub body 50.

In other words, adjusting the distance between the hub body 50 (which is fixed to the bicycle frame) and the brake disc 11 equates to adjusting the distance between the caliper 101 and the brake disc 11, obviously except for a conversion factor.

The aforementioned distance between the hub body 50 and the brake disc 11 can be defined for example by taking as reference a middle plane of the hub body 50 perpendicular to the rotation axis X of the hub body 50 itself.

In a first embodiment of the invention illustrated in FIGS. 2 to 5, each stop area 56 comprises a stop wall 57, an insertion opening 58 and two shoulders 59.

The stop wall 57 is flat, extends radially from the connection portion 54 (FIG. 3) and lies in a circumferential plane, so as to be perpendicular to the hub axis X.

The stop wall 57 is arranged axially in an area close to the connection flange 52 with the spokes of the wheel.

The two shoulders 59 are defined by mutually parallel planes, which are substantially rectilinear and parallel to an axial direction and have an extension in the radial direction at least equal to the extension in the radial direction of the protuberances 16.

The two shoulders 59 extend from the insertion opening 58 to the stop wall 57 and delimit the width in the circumferential direction of the stop area 56.

In this embodiment, there are preferably three stop areas 56 of each plurality of stop areas 56, namely each protuberance 16 can be inserted by selecting among three different stop areas 56.

In other variant embodiments (not illustrated), there can be more than three stop areas 56 of each plurality of stop areas 56, for example four or five.

In any case, there must be at least two stop areas 56 of each plurality of stop areas 56.

Two identical stop areas 56 of two pluralities of circumferentially adjacent stop areas are spaced by an angle equal to the angle that separates two circumferentially adjacent protuberances 16.

Each stop wall 57 is spaced in the axial direction from another stop wall 57 of the same plurality of stop areas 56 by a predetermined amount or by a multiple of such a predetermined amount.

Such a predetermined amount is comprised between 0.010 mm and 1 mm, preferably it is about 0.025 mm.

The protuberances 16 extend beyond the axial space occupied by the brake disc 11, namely they project axially from the brake disc 11.

The protuberances 16 project axially from only one of the two opposite surfaces of the brake disc 11 and in particular from the axially inner surface of the brake disc 11, namely the surface facing towards the hub body 50.

The protuberances 16 have a substantially prismatic shape and comprise an abutment surface 17 and two opposite side surfaces 18 extending axially.

The abutment surface 17 is flat, joins the two side surfaces 18 and has a radial extension, namely it is substantially perpendicular to the hub axis X.

The abutment surface 17 is intended to contact the stop wall 57 when the protuberance 16 is inserted in the stop area 56, preventing any translation in the axially inner direction of the brake disc 11 with respect to the hub body 50.

For this purpose, the abutment surface 17 is radially aligned with the stop wall 57, namely it is arranged at the same distance as the stop wall 57 from the hub axis X.

The circumferential extension of the abutment surface 17 is equal to the circumferential extension of the insertion opening 58 of the stop area 56.

In other words, when the protuberance 16 is engaged in a stop area 56, the circumferentially opposite side walls 18 of the protuberance 16 are in contact with the shoulders 59 of the stop area 56.

By selecting the stop area 56 that each protuberance must engage, it is possible to select the axial position that the brake disc 11 must assume with respect to the hub body 50 and, therefore, with respect to the frame 100 and to the brake calipers 102.

In the first embodiment, the protuberances 16 project radially in the opening 15 of the brake disc 11, as shown in FIG. 2.

The protuberances 16 extend axially inside the opening 15 of the brake disc 11 preferably for the entire axial thickness of the opening 15 itself.

The shoulders 59 of the stop areas 56 have an axial extension such as to also extend inside the opening 15 of the brake disc 11 when the brake disc 11 is mounted on the hub body 50.

In this way, when the protuberances 16 are engaged in the stop areas 56, the brake disc 11 is prevented from rotating with respect to the hub body 50, transferring the braking action exerted on the brake track 12 to the hub body 50 and thus to the wheel.

In this embodiment, the diameter of the connection portion 54 of the hub body 50 at the radial end 53 of the hub body 50 is smaller than the diameter of the opening 15 of the brake disc 11.

The diameter of the connection portion 54 of the hub body 50 increased by the radial extension of the stop walls 57 of the stop areas is substantially equal to the diameter of the opening 15 of the brake disc 11.

Figure 5:
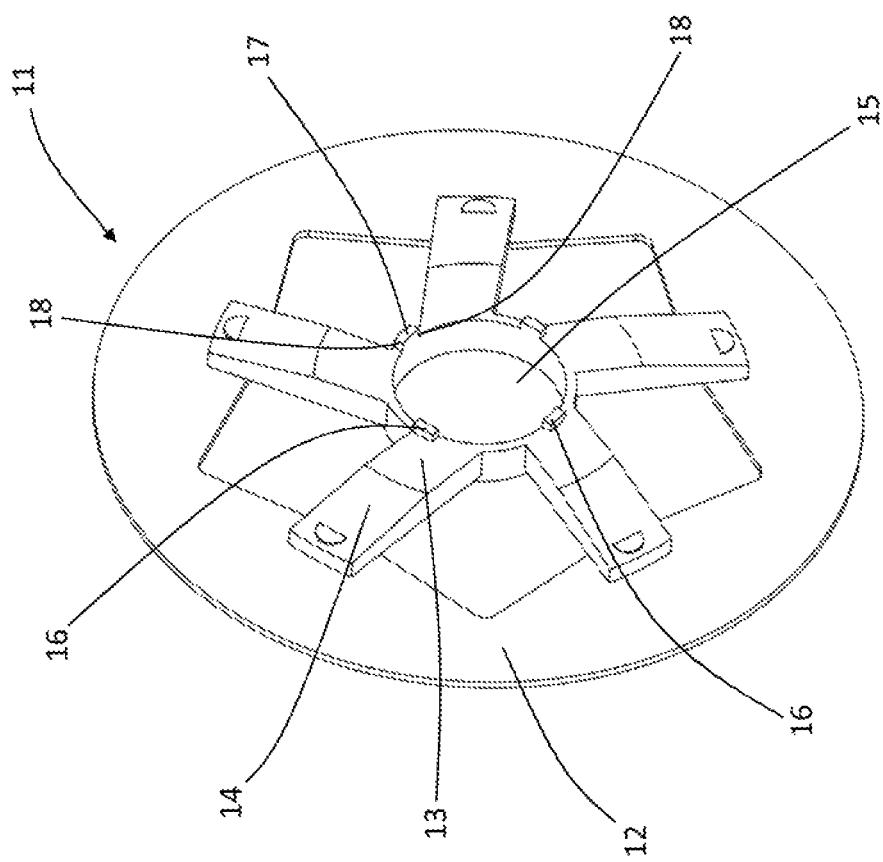
FIG. 5 is a schematic perspective view of a brake disc of a second embodiment of a brake disc assembly in accordance with the present invention.
Figure 4:
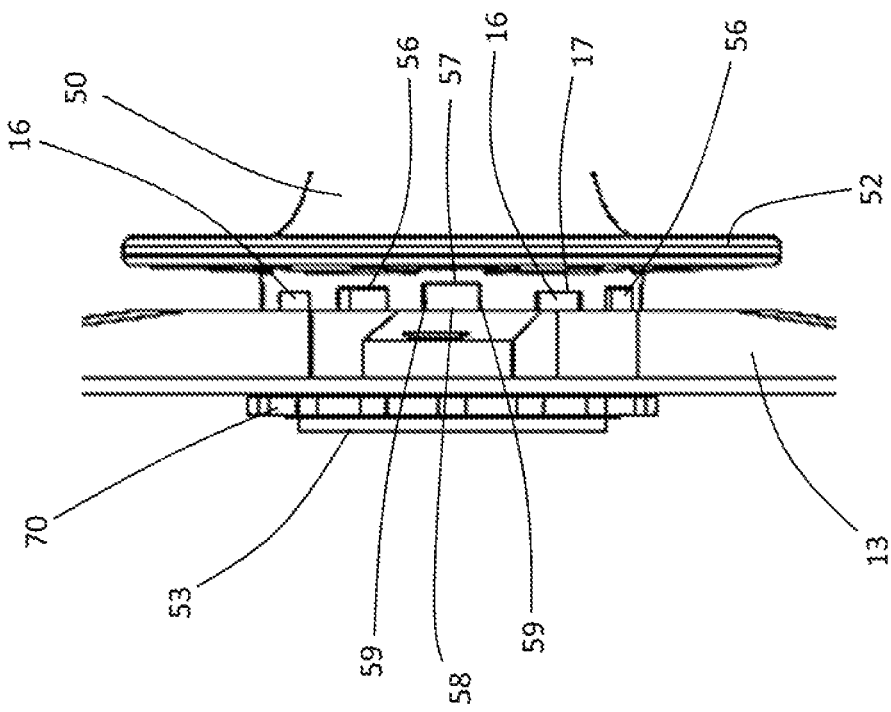
FIG. 4 is a schematic view of the brake disc assembly of the first embodiment.
Figure 7:
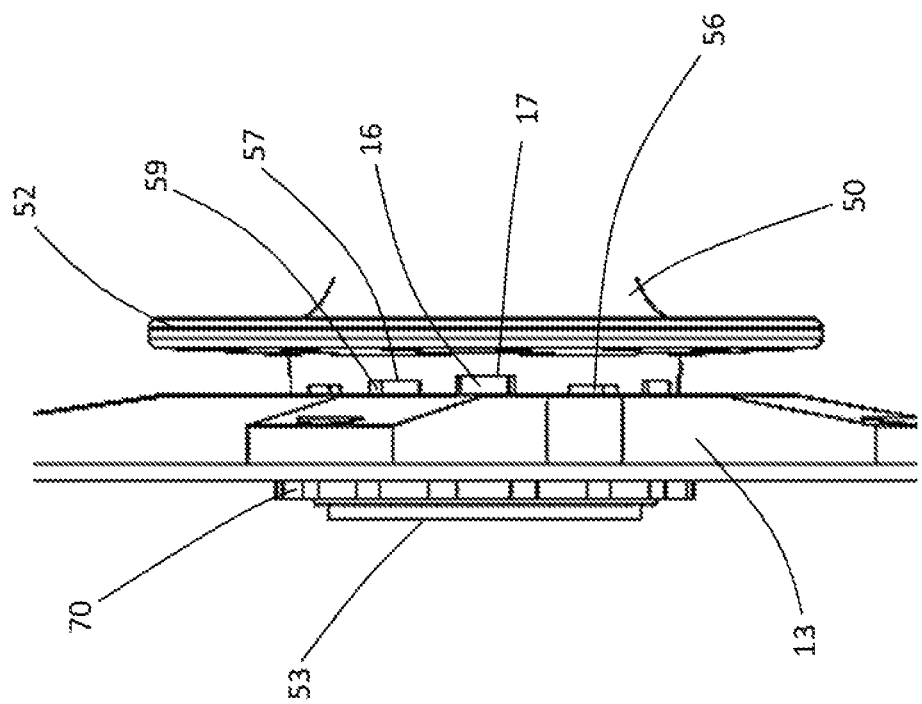
FIG. 7 is a schematic view of the brake disc assembly of the second embodiment.
Figure 6:
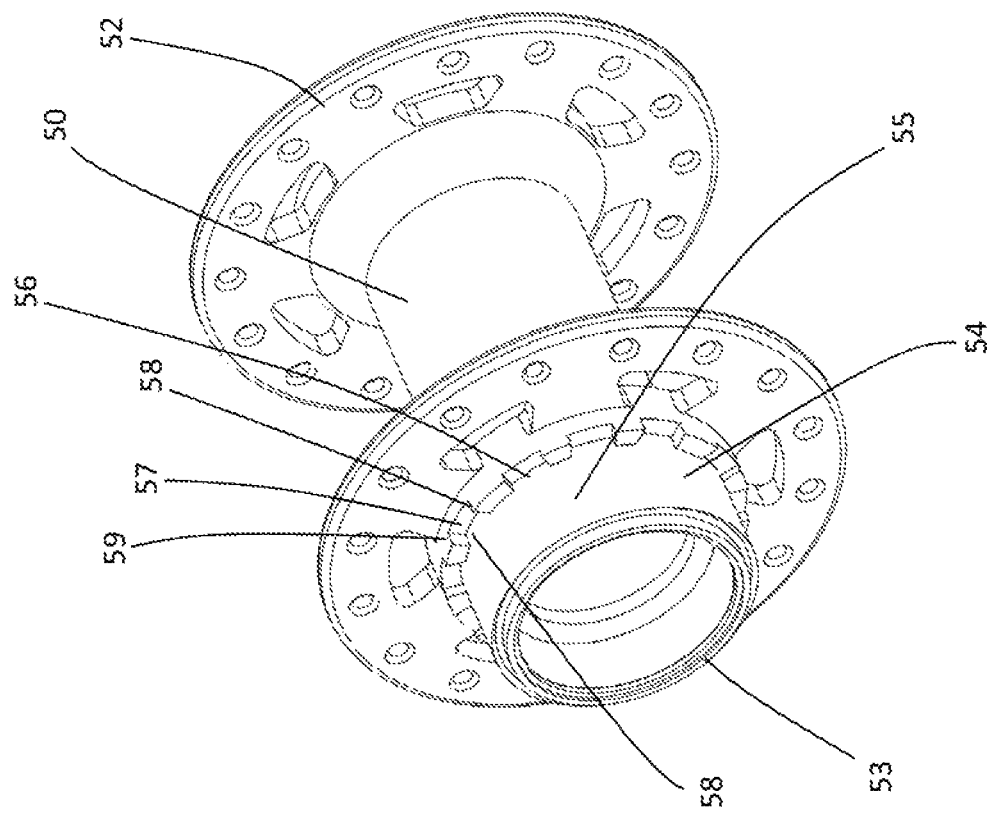
FIG. 6 is a schematic perspective view of a hub body of the second embodiment.

In a second embodiment of the invention illustrated in FIGS. 5 to 7, each stop area 56 comprises a stop wall 57, an insertion opening 58 and two shoulders 59 (FIG. 6).

The stop wall 57 is flat, extends radially from the connection portion 54 (FIG. 6) and lies in a circumferential plane, so as to be perpendicular to the hub axis X.

The stop wall 57 is arranged axially in an area close to the connection flange 52 with the spokes of the wheel.

The two shoulders 59 are defined by mutually parallel planes, which are substantially rectilinear and parallel to an axial direction and have an extension in the radial direction at least equal to the extension in the radial direction of the protuberances 16.

The two shoulders 59 extend from the insertion opening 58 to the stop wall 57 and delimit the width in the circumferential direction of the stop area 56.

In this embodiment, there are preferably three stop areas 56 of each plurality of stop areas 56, namely each protuberance 16 can be inserted by selecting among three different stop areas 56.

In other variant embodiments (not illustrated), there can be more than three stop areas 56 of each plurality of stop areas 56, for example four or five.

In any case, there must be at least two stop areas 56 of each plurality of stop areas 56.

Two identical stop areas 56 of two pluralities of circumferentially adjacent stop areas are spaced by an angle equal to the angle that separates two circumferentially adjacent protuberances 16.

Each stop wall 57 is spaced in the axial direction from another stop wall 57 of the same plurality of stop areas 56 by a predetermined amount or by a multiple of such a predetermined amount.

Such a predetermined amount is comprised between 0.010 mm and 1 mm, preferably it is about 0.025 mm.

The protuberances 16 extend beyond the axial space occupied by the brake disc 11, namely they project axially from the brake disc 11.

The protuberances 16 project axially from only one of the two opposite surfaces of the brake disc 11 and in particular from the axially inner surface of the brake disc 11, namely the surface facing towards the hub body 50.

The protuberances 16 have a substantially prismatic shape and comprise an abutment surface 17 and two opposite side surfaces 18 extending axially.

The abutment surface 17 is flat, joins the two side surfaces 18 and has a radial extension, namely it is substantially perpendicular to the hub axis X.

The abutment surface 17 is intended to contact the stop wall 57 when the protuberance 16 is inserted in the stop area 56, preventing any translation in the axially inner direction of the brake disc 11 with respect to the hub body 50.

For this purpose, the abutment surface 17 is radially aligned with the stop wall 57, namely it is arranged at the same distance from the hub axis X as the stop wall 57.

The circumferential extension of the abutment surface 17 is equal to the circumferential extension of the insertion opening 58 of the stop area 56.

In other words, when the protuberance 16 is engaged in a stop area 56, the circumferentially opposite side walls 18 of the protuberance 16 are in contact with the shoulders 59 of the stop area 56.

By selecting the stop area 56 that each protuberance must engage, it is possible to select the axial position that the brake disc must assume with respect to the hub body 50 and, therefore, with respect to the frame 100 and to the brake calipers 102.

In the second embodiment, the protuberances 16 are radially outer with respect to the opening 15 of the brake disc 11, as shown in FIG. 5.

The shoulders 59 of the stop areas 56 have an axial extension less than or equal to the distance in the axial direction between the insertion opening 58 and the stop wall 57 of the stop area 56 the stop wall 57 of which is axially innermost.

In this way, whatever the stop area 56 engaged by a protuberance 16, the abutment surface 17 of the protuberance is always in contact with the stop wall 57 of the stop area 56.

When the protuberances 16 are engaged in the stop areas 56, the brake disc 11 is prevented from rotating with respect to the hub body 50, transferring the braking action exerted on the brake track 12 to the hub body 50 and thus to the wheel.

In this embodiment, the diameter of the connection portion 54 of the hub body 50 at the radial end 53 of the hub body 50 is substantially equal to the diameter of the opening 15 of the brake disc 11.

The diameter of the connection portion 54 of the hub body 50 increased by the radial extension of the stop walls 57 of the stop areas is greater than the diameter of the opening 15 of the brake disc 11.

Figure 9:
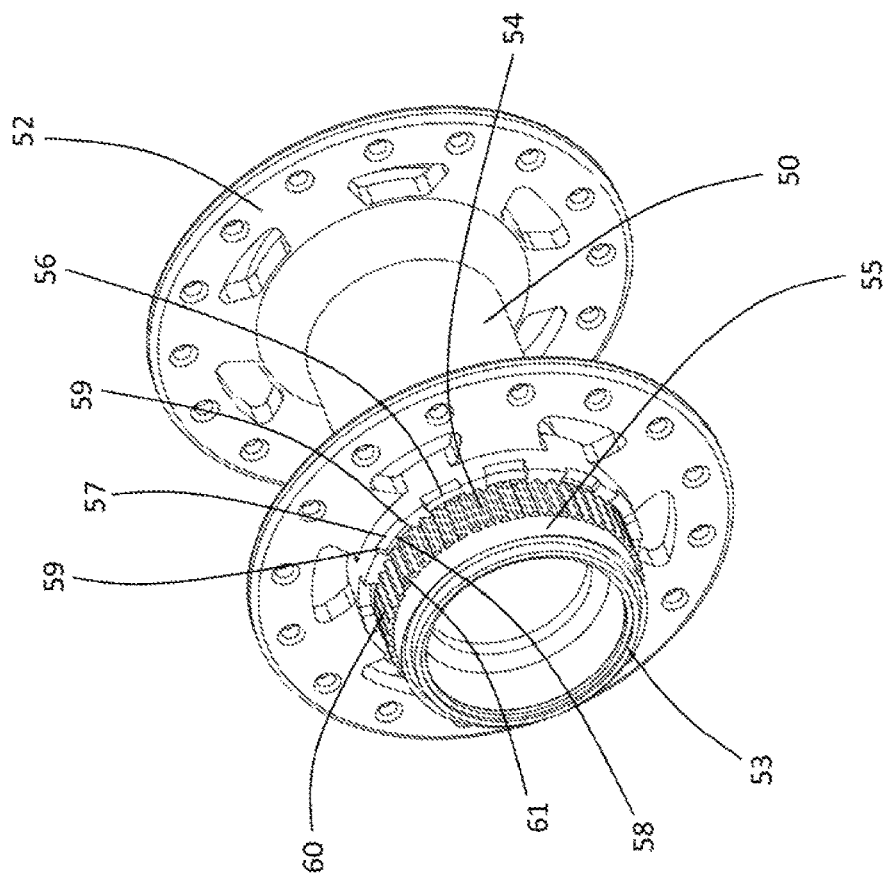
FIG. 9 is a schematic perspective view of a hub body of the third embodiment.
Figure 8:
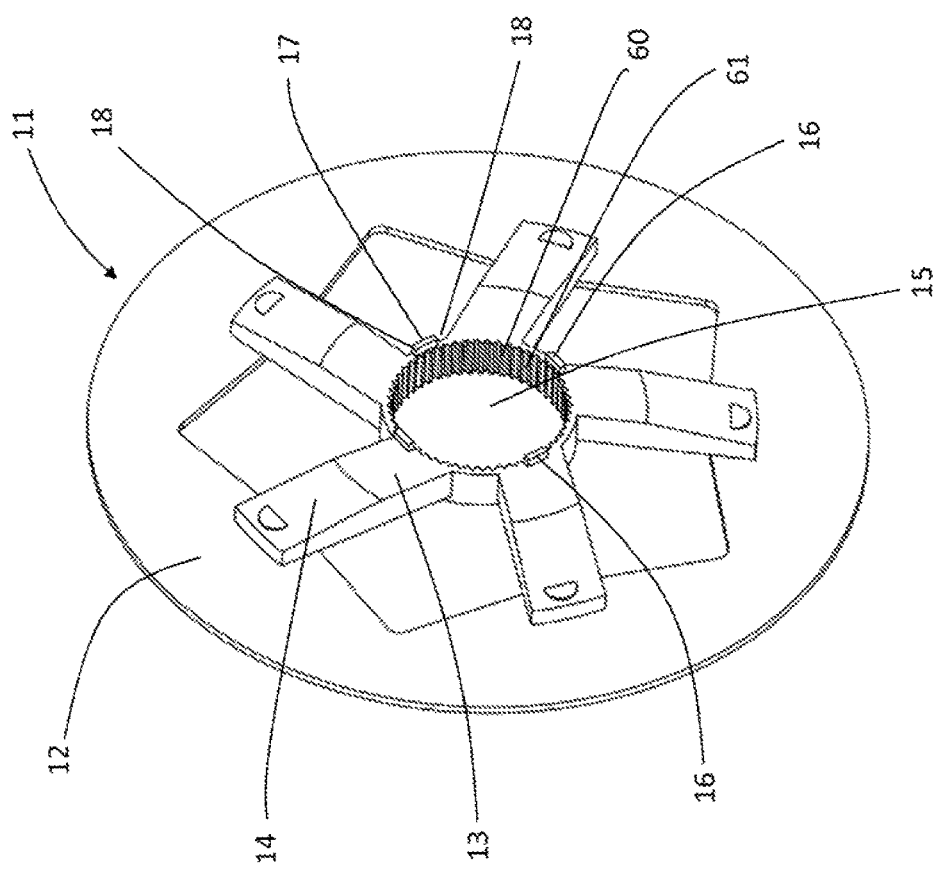
FIG. 8 is a schematic perspective view of a brake disc of a third embodiment of a brake disc assembly in accordance with the present invention.

In a third embodiment of the invention illustrated in FIGS. 8 to 10, each stop area 56 comprises a stop wall 57, an insertion opening 58 and two shoulders 59 (FIG. 9).

The stop wall 57 is flat, extends radially from the connection portion 54 and lies in a circumferential plane, so as to be perpendicular to the hub axis X.

The stop wall 57 is arranged axially in an area close to the connecting flange 52 with the spokes of the wheel.

The two shoulders 59 are defined by planes that are parallel to one another, substantially rectilinear and parallel to an axial direction and have an extension in the radial direction at least equal to the extension in the radial direction of the protuberances 16.

The two shoulders 59 extend from the insertion opening 58 to the stop wall 57 and delimit the width in the circumferential direction of the stop area 56.

In this embodiment, there are preferably three stop areas 56 of each plurality of stop areas 56, namely each protuberance 16 can be inserted by selecting among three different stop areas 56.

In other variant embodiments (not illustrated), there can be more than three stop areas 56 of each plurality of stop areas 56, for example four or five.

In any case, there must be at least two stop areas 56 of each plurality of stop areas 56.

Two identical stop areas 56 of two pluralities of circumferentially adjacent stop areas are spaced by an angle equal to the angle that separates two circumferentially adjacent protuberances 16.

Each stop wall 57 is spaced in the axial direction from another stop wall 57 of the same plurality of stop areas 56 by a predetermined amount or by a multiple of such a predetermined amount.

Such a predetermined amount is comprised between 0.010 mm and 1 mm, preferably it is about 0.025 mm.

The protuberances 16 extend beyond the axial space occupied by the brake disc 11, namely they project axially from the brake disc 11.

The protuberances 16 project axially from only one of the two opposite surfaces of the brake disc 11 and in particular from the axially inner surface of the brake disc 11, namely the surface facing towards the hub body 50.

The protuberances 16 have a substantially prismatic shape and comprise a substantially flat abutment surface 17 and two opposite side surfaces 18 extending axially.

The abutment surface 17 joins the two side surfaces 18 and has a radial extension, namely it is substantially perpendicular to the hub axis X.

The abutment surface 17 is intended to contact the stop wall 57 when the protuberance 16 is inserted in the stop area 56, preventing any translation in the axially inner direction of the brake disc 11 with respect to the hub body 50.

For this purpose, the abutment surface 17 is radially aligned with the stop wall 57, namely it is arranged at the same distance from the hub axis X as the stop wall 57.

The circumferential extension of the abutment surface 17 is preferably smaller than the circumferential extension of the insertion opening 58, so that there is a clearance in the circumferential direction between the protuberance 16 and the stop area 56 engaged by the same.

By selecting the stop area 56 that each protuberance must engage, it is possible to select the axial position that the brake disc must assume with respect to the hub body 50 and, therefore, with respect to the frame 100 and to the brake calipers 102.

In the third embodiment, the protuberances 16 are radially outer with respect to the opening 15 of the brake disc 11, as shown in FIG. 8.

The shoulders 59 of the stop areas 56 have an axial extension less than or equal to the distance in the axial direction between the insertion opening 58 and the stop wall 57 of the stop area 56 the stop wall 57 of which is axially innermost.

In this way, whatever stop area 56 is engaged by a protuberance 16, the abutment surface 17 of the protuberance 16 is always in contact with the stop wall 57 of the stop area 56.

The opening 15 of the central portion 13 of the brake disc 11 is shaped according to a shape fitting profile. With this term it is meant that the radially inner profile of the opening 15 of the brake disc 11 has geometric characteristics such as to allow the transmission of a torque between the brake disc 11 and the hub body 50 when the connection portion 54 is provided with a matching profile. A shape fitting profile can for example be a polygonal profile, or a circular profile with an alteration (for example flattened along a chord), or other.

In particular, protrusions 60 and grooves 61 oriented in the axial direction are obtained on the radially inner surface of the opening 15 of the brake disc 11 and on the radially outer surface of the coupling portion 54 of the hub body 50.

In this way, when the protuberances 16 are engaged in the stop areas 56, and therefore the coupling portion 54 of the hub body 50 is inserted in the opening 15 of the brake disc 11, any rotation between the brake disc 11 and the hub body 50 is prevented, transferring the braking action exerted on the brake track 12 to the hub body 50 and thus to the wheel.

In this embodiment, the diameter of the connection portion 54 of the hub body 50 at the radial end 53 of the hub body 50 is substantially equal to the diameter of the opening 15 of the brake disc 11, so that the protrusions 60 of the hub body 50 insert in the grooves 61 of the brake disc 11 and so that the protrusions 60 of the brake disc 11 insert in the grooves 61 of the hub body 50.

The circumferential extension of the protrusions 60 and of the grooves 61 is much less than the circumferential extension of the protuberances 16, preferably the circumferential extension of the grooves 60 and of the protrusions 60 is at least three times less than the circumferential extension of the protuberances 16.

In this way, it is always possible to angularly orient the brake disc 11 with respect to the hub body 50 to ensure that the protuberances 16 insert in the stop areas 56 without there being interference between protrusions 60 of the brake disc 11 and of the hub body 50.

The diameter of the connection portion 54 of the hub body 50 increased by the radial extension of the stop walls 57 of the stop areas 56 is greater than the diameter of the opening 15 of the brake disc 11.

In a fourth embodiment of the invention illustrated in FIGS. 11 to 13, each stop area 56 comprises a stop wall 57, an insertion opening 58 and a shoulder 59 (FIG. 12).

The stop wall 57 is flat, extends radially from the connection portion 54 and lies in a circumferential plane, so as to be perpendicular to the hub axis X.

The stop wall 57 is arranged axially in an area close to the connecting flange 52 with the spokes of the wheel.

The stop areas 56 of a same plurality of stop areas 56 are adjacent to one another and consecutive so that the insertion openings 58 are not physically separate but define a single continuous opening in the circumferential direction, as shown in FIG. 12.

The shoulder 59 is a flat surface, aligned with an axial direction and having an extension in the radial direction at least equal to the extension in the same direction of a protuberance 16.

A stop wall 57 is separated from the adjacent stop wall 57 by the shoulder 59, which extends axially from one stop wall 57 to the adjacent and consecutive stop wall 57.

In other words, the stop walls 57 of a same plurality of stop areas 56 form a sort of stepped ramp.

The stop walls 57 of the stop areas 56 of a same plurality of stop areas 56 arranged at the circumferential ends comprise a second shoulder 59a.

The second shoulder 59a is a flat surface, aligned with an axial direction and having an extension in the radial direction equal to that of the shoulder 59.

The circumferential distance between two second shoulders 59a defines the circumferential extension of the plurality of stop areas 56.

In this embodiment, there are preferably five stop areas 56 of each plurality of stop areas 56, namely each protuberance 16 can be inserted by selecting among five different stop areas 56.

In other variant embodiments (not illustrated), there can be more or less than five stop areas 56 of each plurality of stop areas 56, for example six, four or three.

In any case, there must be at least two stop areas 56 of each plurality of stop areas 56.

Two identical stop areas 56 of two pluralities of circumferentially adjacent stop areas are spaced by an angle equal to the angle that separates two circumferentially adjacent protuberances 16.

Each stop wall 57 is spaced in the axial direction from another stop wall 57 of the same plurality of stop areas 56 by a predetermined amount or by a multiple of such a predetermined amount.

Such a predetermined amount is comprised between 0.001 mm and 1 mm, preferably it is about 0.025 mm.

The axial distance that separates a stop wall 57 of a first stop area 56 from the stop wall 57 of a second adjacent and consecutive stop area 56 is given by the extension in the axial direction of the shoulder 59 of the first stop area 56.

The protuberances 16 extend beyond the axial space occupied by the brake disc 11, namely they project axially from the brake disc 11.

The protuberances 16 project axially from only one of the two opposite surfaces of the brake disc 11 and in particular from the axially inner surface of the brake disc 11, namely the surface facing towards the hub body 50.

The protuberances 16 have a substantially prismatic shape and comprise an abutment surface 17 and two opposite side surfaces 18 extending axially.

The abutment surface 17 is substantially flat, joins the two side surfaces 18 and has a radial extension, namely it is substantially perpendicular to the hub axis X.

The abutment surface 17 is intended to contact the stop wall 57 when the protuberance 16 is inserted in the stop area 56, preventing any translation in the axially inner direction of the brake disc 11 with respect to the hub body 50.

For this purpose, the abutment surface 17 is radially aligned with the stop wall 57, namely it is arranged at the same distance from the hub axis X as the stop wall 57.

The circumferential extension of the abutment surface 17 is preferably less than the circumferential extension of the insertion opening 58, so that there is a clearance in the circumferential direction between the protuberance 16 and the stop area 56 engaged by the same.

By selecting the stop area 56 that each protuberance 16 must engage, it is possible to select the axial position that the brake disc must assume with respect to the hub body 50 and, therefore, with respect to the frame 100 and to the brake calipers 102.

In the fourth embodiment, the protuberances 16 are radially outer with respect to the opening 15 of the brake disc 11, as shown in FIG. 8.

The second shoulder 59a of the stop area 56 the stop wall 57 of which is axially innermost has an axial extension less than or equal to the axial extension of a protuberance 16 of the brake disc 11.

In this way, whatever stop area 56 is engaged by a protuberance 16, the abutment surface 17 of the protuberance 16 is always in contact with the stop wall 57 of the stop area 56.

The opening 15 of the central portion 13 of the brake disc 11 is shaped according to a shape fitting profile. With this term it is meant that the radially inner profile of the opening 15 of the brake disc 11 has geometric characteristics such as to allow the transmission of a torque between the brake disc 11 an the hub body 50 when the connection portion 54 is provided with a matching profile. A shape fitting profile can for example be a polygonal profile, or a circular profile with an alteration (for example flattened along a chord), or other.

In particular, protrusions 60 and grooves 61 oriented in the axial direction are obtained on the radially inner surface of the opening 15 of the brake disc 11 and on the radially outer surface of the coupling portion 54 of the hub body 50.

In this way, when the protuberances 16 are engaged in the stop areas 56, and therefore the coupling portion 54 of the hub body 50 is inserted in the opening 15 of the brake disc 11, any rotation between the brake disc 11 and the hub body 50 is prevented, transferring the braking action exerted on the brake track 12 to the hub body 50 and thus to the wheel.

In this embodiment, the diameter of the connection portion 54 of the hub body 50 at the radial end 53 of the hub body 50 is substantially equal to the diameter of the opening 15 of the brake disc 11, so that the protrusions 60 of the hub body 50 insert in the grooves 61 of the brake disc 11 and so that the protrusions 60 of the brake disc 11 insert in the grooves 61 of the hub body 50.

The circumferential extension of the protrusions 60 and of the grooves 61 is much less than the circumferential extension of the protuberances 16, preferably the circumferential extension of the grooves 61 and of the protrusions 60 is at least three times less than the circumferential extension of the protuberances 16.

In this way, it is always possible to angularly orient the brake disc 11 with respect to the hub body 50 to ensure that the protuberances 16 insert in the preselected stop areas 56 without there being interference between protrusions 60 of the brake disc 11 and of the hub body 50.

The diameter of the connection portion 54 of the hub body 50 increased by the radial extension of the stop walls 57 of the stop areas is greater than the diameter of the opening 15 of the brake disc 11.

In a fifth embodiment of the invention illustrated in FIGS. 14 to 16, each stop area 56 comprises a stop wall 57 and an insertion opening 58 (FIG. 15).

The stop wall 57 extends radially from the connection portion 54 and lies on an inclined plane that is perpendicular to the hub axis X.

The stop wall 57 is arranged axially in an area close to the connecting flange 52 with the spokes of the wheel.

The stop areas 56 of a same plurality of stop areas 56 are adjacent to one another and consecutive so that the insertion openings 58 are not physically separate but define a single continuous opening in the circumferential direction, as shown in FIG. 15.

In particular, one stop wall 57 is not physically separate from the adjacent stop wall and the stop walls 57 of a same plurality of stop areas 56 define a single inclined plane 57a.

Such a single inclined plane 57a is such that the axially innermost area (defined by a stop wall 57) is axially spaced from the axially outermost area (defined by a further stop wall) by a predetermined amount or by a multiple of such a predetermined amount.

Such a predetermined amount is comprised between 0.010 mm and 1 mm, preferably it is about 0.025 mm.

At a circumferential end of the single inclined plane 57a defined by the stop walls 57 there is a shoulder 59 that extends in the axial direction and that defines a circumferential limit for the stop areas 56 of a same plurality of stop areas 56.

The shoulder 59 of the next plurality of stop areas 56 is arranged at the opposite axial end of the single inclined plane 57a, as represented in FIG. 15.

Alternatively, at the opposite axial end of the single inclined plane 57a it is possible to provide a further shoulder having a smaller axial dimension than the axial dimension of the first shoulder 59.

Two identical stop areas 56 of two pluralities of circumferentially adjacent stop areas are spaced by an angle equal to the angle that separates two circumferentially adjacent protuberances 16.

The protuberances 16 extend beyond the axial space occupied by the brake disc 11, namely they project axially from the brake disc 11.

The protuberances 16 project axially from only one of the two opposite surfaces of the brake disc 11 and in particular from the axially inner surface of the brake disc 11, namely the surface facing towards the hub body 50.

The protuberances 16 comprise an arched axial end surface 20, so that the protuberances 16 end with an abutment surface 17 ideally given by a line.

The abutment surface 17 is substantially perpendicular to the hub axis X.

The abutment surface 17 is intended to contact the single inclined plane 57a at a stop wall 57 when the protuberance 16 is inserted in the stop area 56, preventing any translation in the axially inner direction of the brake disc 11 with respect to the hub body 50.

For this purpose, the abutment surface 17 is radially aligned with the stop walls 57, namely it is arranged at the same distance from the hub axis X as the stop walls 57.

The circumferential extension of the protuberance 16 is less than the circumferential extension of the insertion opening 58, so that the abutment surface can contact any stop wall 57 (namely any point of the single inclined plane 57a).

By selecting the stop area 56 that each protuberance must engage, it is possible to select the axial position that the brake disc must assume with respect to the hub body 50 and, therefore, with respect to the frame 100 and to the brake calipers 102.

In the fifth embodiment, the protuberances 16 are radially outer with respect to the opening 15 of the brake disc 11, as shown in FIG. 14.

The shoulder 59 of the stop areas 56 has an axial extension less than or equal to the axial extension of a protuberance 16 of the brake disc 11.

In this way, whatever stop area 56 is engaged by a protuberance 16, the abutment surface 17 of the protuberance 16 is always in contact with the stop wall 57 of the stop area 56.

The opening 15 of the central portion 13 of the brake disc 11 is shaped according to a shape fitting profile. With this term it is meant that the radially inner profile of the opening 15 of the brake disc 11 has geometric characteristics such as to allow the transmission of a torque between the brake disc 11 and the hub body 50 when the connection portion 54 is provided with a matching profile. A shape fitting profile can for example be a polygonal profile, or a circular profile with an alteration (for example flattened along a chord), or other.

In particular, protrusions 60 and grooves 61 oriented in the axial direction are obtained on the radially inner surface of the opening 15 of the brake disc 11 and on the radially outer surface of the coupling portion 54 of the hub body 50.

In this way, when the protuberances 16 are engaged in the stop areas 56, and therefore the coupling portion 54 of the hub body 50 is inserted in the opening 15 of the brake disc 11, any rotation between the brake disc 11 and the hub body 50 is prevented, transferring the braking action exerted on the brake track 12 to the hub body 50 and thus to the wheel.

In this embodiment, the diameter of the connection portion 54 of the hub body 50 at the radial end 53 of the hub body 50 is substantially equal to the diameter of the opening 15 of the brake disc 11, so that the protrusions 60 of the hub body 50 insert in the grooves 61 of the brake disc 11 and so that the protrusions 60 of the brake disc 11 insert in the grooves 61 of the hub body 50.

The circumferential extension of the protrusions 60 and of the grooves 61 is much less than the circumferential extension of the inclined plane 57a, preferably the circumferential extension of the grooves 61 and of the protrusions 60 is at least three times, even more preferably ten times, less than the circumferential extension of the single inclined plane 57a.

In this way, it is always possible to angularly orient the brake disc 11 with respect to the hub body 50 to ensure that the protuberances 16 insert in the preselected stop areas 56 without there being interference between protrusions 60 of the brake disc 11 and of the hub body 50.

The diameter of the connection portion 54 of the hub body 50 increased by the radial extension of the stop walls 57 is greater than the diameter of the opening 15 of the brake disc 11.

Figure 19:
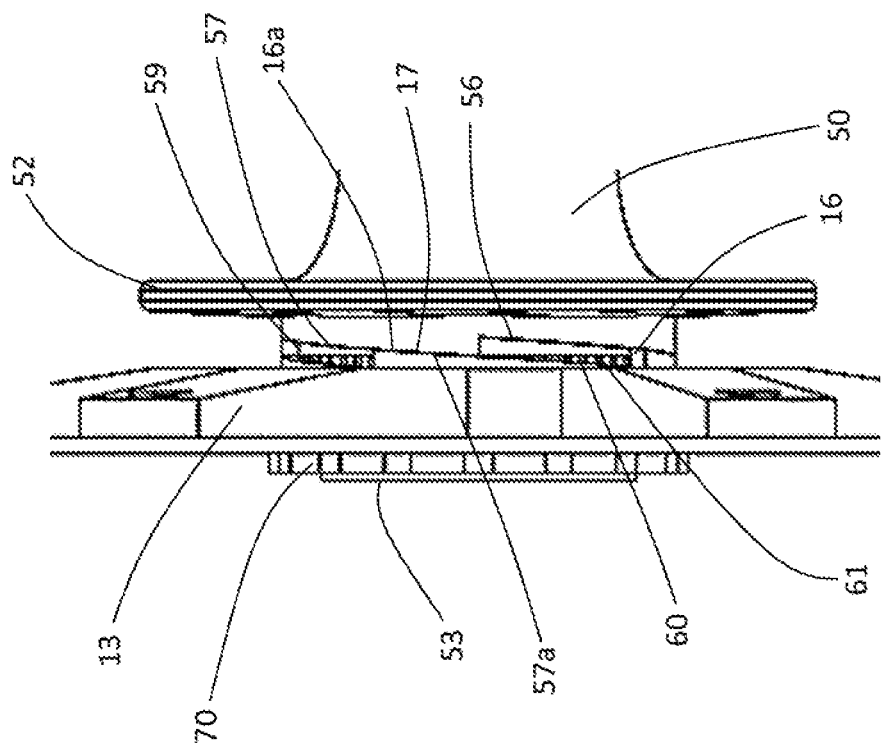
FIG. 19 is a schematic view of the brake disc assembly of the sixth embodiment.
Figure 18:
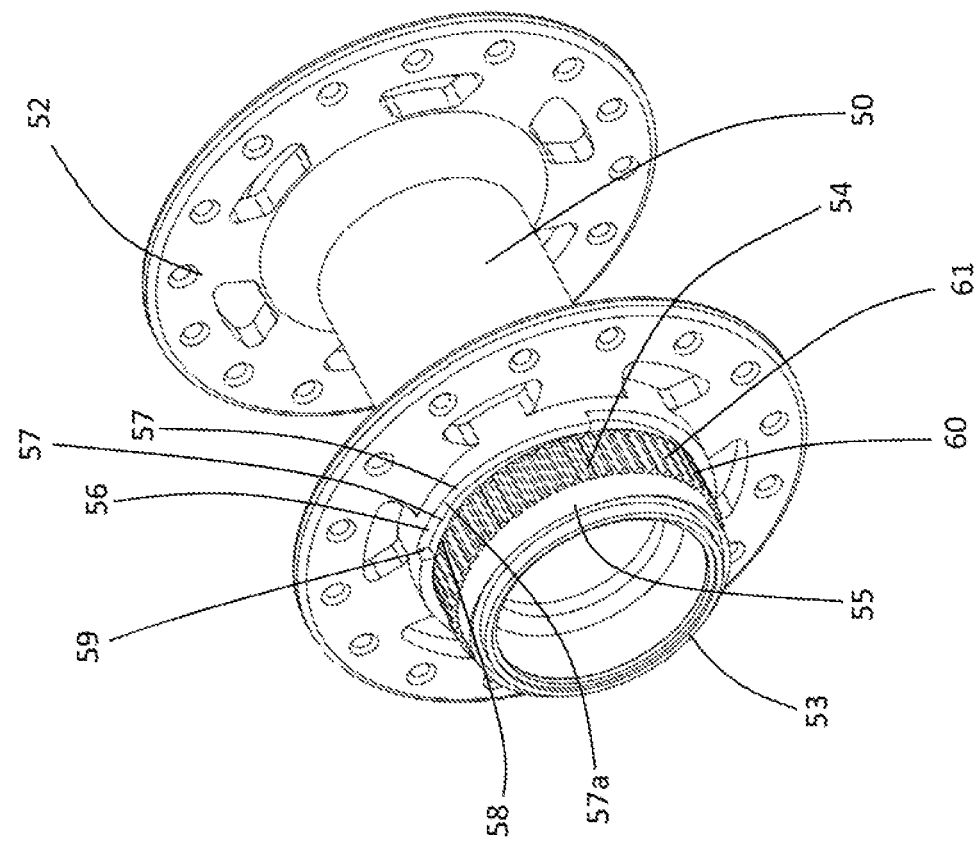
FIG. 18 is a schematic perspective view of a hub body of the sixth embodiment.

In a sixth embodiment of the invention illustrated in FIGS. 17 to 19, each stop area 56 comprises a stop wall 57 and an insertion opening 58 (FIG. 15).

The stop wall 57 extends radially from the connection portion 54 and lies on an inclined plane that is perpendicular to the hub axis X.

The stop wall 57 is arranged axially in an area close to the connecting flange 52 with the spokes of the wheel.

The stop areas 56 of a same plurality of stop areas 56 are adjacent to one another and consecutive so that the insertion openings 58 are not physically separate but define a single continuous opening in the circumferential direction, as shown in FIG. 15.

In particular, one stop wall 57 is not physically separate from the adjacent stop wall and the stop walls 57 of a same plurality of stop areas 56 define a single inclined plane 57a.

Such a single inclined plane 57a is such that the axially innermost area (defined by a stop wall 57) is axially spaced from the axially outermost area (defined by a further stop wall) by a predetermined amount or by a multiple of such a predetermined amount.

Such a predetermined amount is comprised between 0.010 mm and 1 mm, preferably it is about 0.025 mm.

At a circumferential end of the single inclined plane 57a defined by the stop walls 57 there is a shoulder 59 that extends in the axial direction and that defines a circumferential limit for the stop areas 56 of a same plurality of stop areas 56.

The shoulder 59 of the next plurality of stop areas 56 is arranged at the opposite axial end of the single inclined plane 57a, as represented in FIG. 15.

Alternatively, at the opposite axial end of the single inclined plane 57a it is possible to provide a further shoulder having a smaller axial dimension than the axial dimension of the first shoulder 59.

Two identical stop areas 56 of two pluralities of circumferentially adjacent stop areas are spaced by an angle equal to the angle that separates two circumferentially adjacent protuberances 16.

The protuberances 16 extend beyond the axial space occupied by the brake disc 11, namely they project axially from the brake disc 11.

The protuberances 16 project axially from only one of the two opposite surfaces of the brake disc 11 and in particular from the axially inner surface of the brake disc 11, namely the surface facing towards the hub body 50.

The protuberances 16 (FIG. 17) comprise an abutment surface 17.

The abutment surface 17 is defined by the axial end 16a of the protuberance inclined and perpendicular to the hub axis X. The inclination of the axial end 16a of every protuberance 16 is equal to the inclination of the single inclined plane 57a, so that the surface of axial end 16a can contact the single inclined plane 57a with continuity, as schematically illustrated in FIG. 19.

Depending on the portion of the single inclined plane 57a that the axial end 16a contacts when the protuberance 16 is inserted in the stop areas 56, the brake disc 11 assumes different axial positions with respect to the hub body 50.

The contact between the protuberance 16 and the single inclined plane 57a prevents any translation in the axially inner direction of the brake disc 11 with respect to the hub body 50.

The axial end 16a of the protuberance is radially aligned to the stop walls 57, namely it is arranged at the same distance from the pin axis X as the stop walls 57.

The circumferential extension of the protuberance 16 is substantially equal to the circumferential extension of the single inclined plane 57a defined by the stop walls 57.

In the sixth embodiment, the protuberances 16 are radially outer with respect to the opening 15 of the brake disc 11, as shown in FIG. 17.

The shoulder 59 of the stop areas 56 has an axial extension less than or equal to the maximum axial extension of a protuberance 16 of the brake disc 11.

The opening 15 of the central portion 13 of the brake disc 11 is shaped according to a shape fitting profile. With this term it is meant that the radially inner profile of the opening 15 of the brake disc 11 has geometric characteristics such as to allow the transmission of a torque between the brake disc 11 and the hub body 50 when the connection portion 54 is provided with a matching profile. A shape fitting profile can for example be a polygonal profile, or a circular profile with an alteration (for example flattened along a chord), or other.

In particular, protrusions 60 and grooves 61 oriented in the axial direction are obtained on the radially inner surface of the opening 15 of the brake disc 11 and on the radially outer surface of the coupling portion 54 of the hub body 50.

In this way, when the protuberances 16 are engaged in the stop areas 56, and therefore the coupling portion 54 of the hub body 50 is inserted in the opening 15 of the brake disc 11, any rotation between the brake disc 11 and the hub body 50 is prevented, transferring the braking action exerted on the brake track 12 to the hub body 50 and thus to the wheel.

In this embodiment, the diameter of the connection portion 54 of the hub body 50 at the radial end 53 of the hub body 50 is substantially equal to the diameter of the opening 15 of the brake disc 11, so that the protrusions 60 of the hub body 50 insert in the grooves 61 of the brake disc 11 and so that the protrusions 60 of the brake disc 11 insert in the grooves 61 of the hub body 50.

The circumferential extension of the protrusions 60 and of the grooves 61 is much less than the circumferential extension of the inclined plane 57a, preferably the circumferential extension of the grooves 61 and of the protrusions 60 is at least three times, even more preferably ten times, less than the circumferential extension of the single inclined plane 57a.

In this way, it is always possible to angularly orient the brake disc 11 with respect to the hub body 50 to ensure that the protuberances 16 insert in the preselected stop areas 56 without there being interference between protrusions 60 of the brake disc 11 and of the hub body 50.

The diameter of the connection portion 54 of the hub body 50 increased by the radial extension of the stop walls 57 is greater than the diameter of the opening 15 of the brake disc 11.

Figure 21:
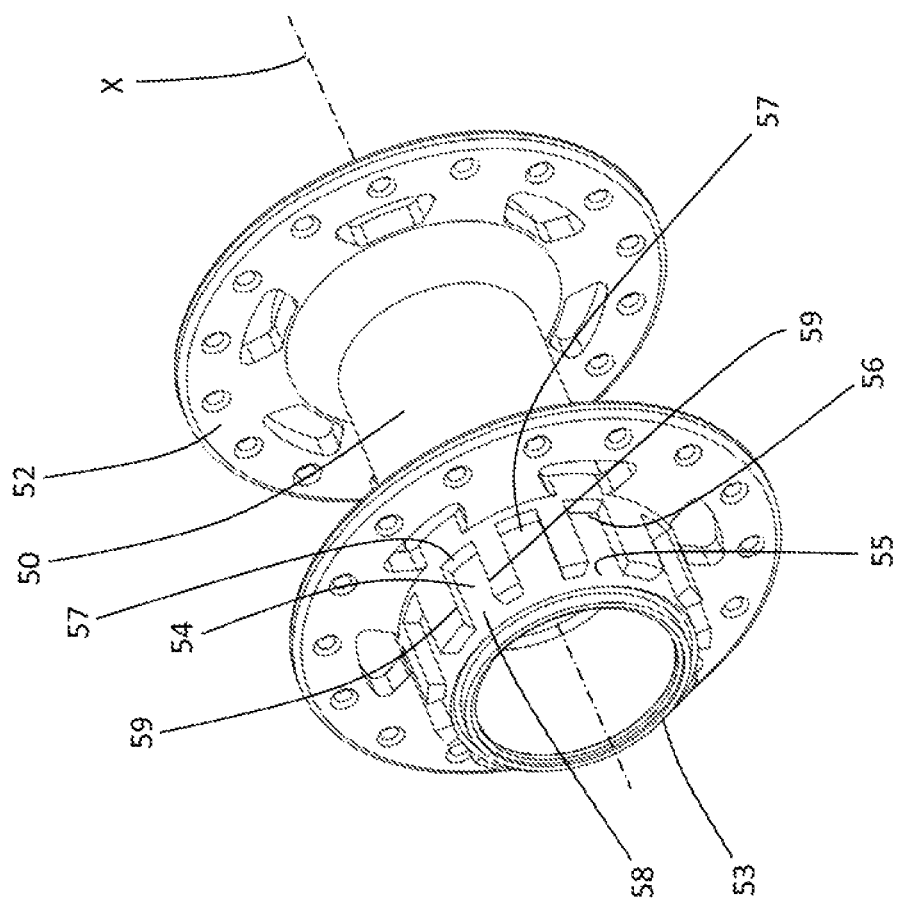
FIG. 21 is a schematic perspective view of a hub body of the seventh embodiment.
Figure 20:
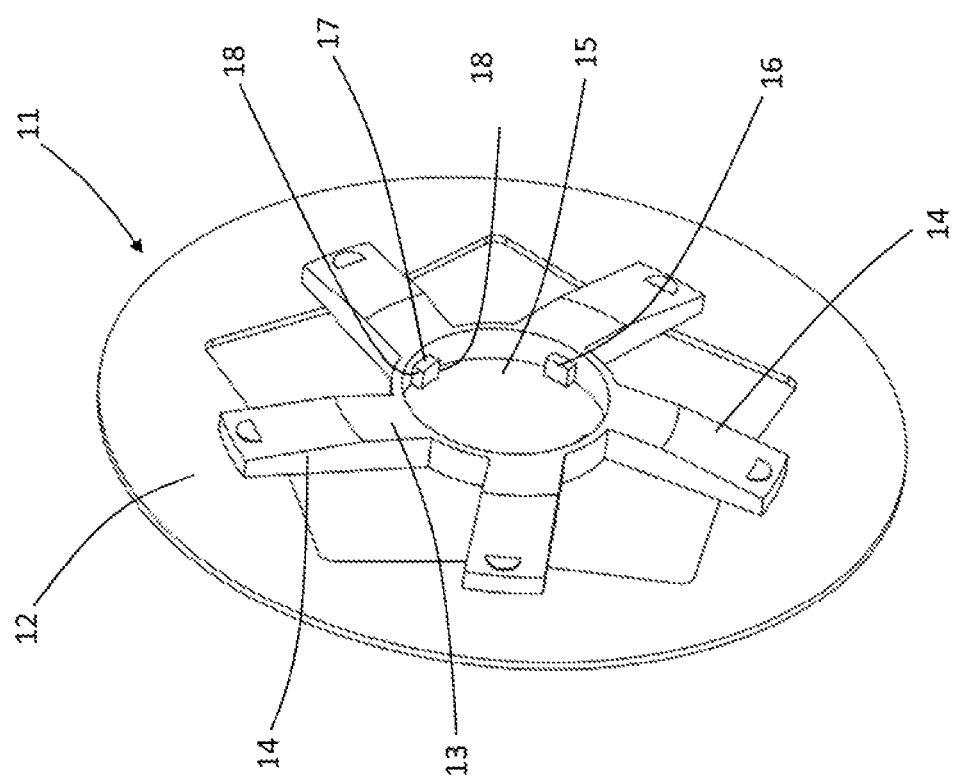
FIG. 20 is a schematic perspective view of a brake disc of a seventh embodiment of a brake disc assembly in accordance with the present invention.
Figure 22:
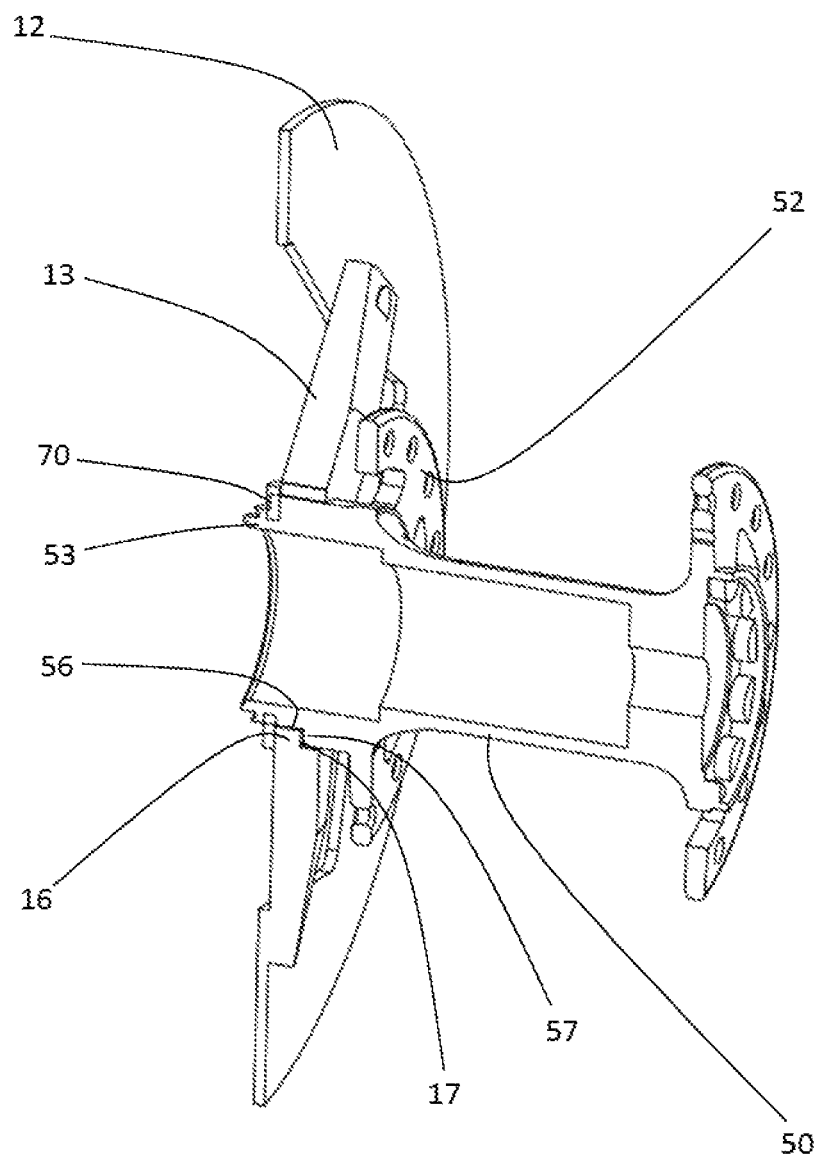
FIG. 22 is a schematic perspective cross-sectional view of the brake disc assembly of the seventh embodiment.

In a seventh embodiment of the invention, illustrated in FIGS. 20 and 21, each stop area 56 comprises a stop wall 57, an insertion opening 58 and two shoulders 59.

The stop wall 57 is flat, extends radially from the connection portion 54 (FIG. 21) and lies in a circumferential plane, so as to be perpendicular to the hub axis X.

The stop wall 57 is arranged axially in an area close to the connecting flange 52 with the spokes of the wheel.

The two shoulders 59 are defined by planes that are parallel to one another, substantially rectilinear and parallel to an axial direction and have an extension in the radial direction at least equal to the extension in the radial direction of the protuberances 16.

The two shoulders 59 extend from the insertion opening 58 to the stop wall 57 and delimit the width in the circumferential direction of the stop area 56.

In this embodiment, there are preferably three stop areas 56 of each plurality of stop areas 56, namely each protuberance 16 can be inserted by selecting among three different stop areas 56.

In other variant embodiments (not illustrated), there can be more than three stop areas 56 of each plurality of stop areas 56, for example four or five.

In any case, there must be at least two stop areas 56 of each plurality of stop areas 56.

Two identical stop areas 56 of two pluralities of circumferentially adjacent stop areas are spaced by an angle equal to the angle that separates two circumferentially adjacent protuberances 16.

Each stop wall 57 is spaced in the axial direction from another stop wall 57 of the same plurality of stop areas 56 by a predetermined amount or by a multiple of such a predetermined amount.

Such a predetermined amount is comprised between 0.010 mm and 1 mm, preferably it is about 0.025 mm.

The protuberances 16 have a substantially prismatic shape and comprise an abutment surface 17 and two opposite side surfaces 18 extending axially.

The abutment surface 17 is flat, joins the two side surfaces 18 and has a radial extension, namely it is substantially perpendicular to the hub axis X.

The abutment surface 17 is intended to contact the stop wall 57 when the protuberance 16 is inserted in the stop area 56, preventing any translation in the axially inner direction of the brake disc 11 with respect to the hub body 50.

For this purpose, the abutment surface 17 is radially aligned to the stop wall 57, namely it is arranged at the same distance as the stop wall 57 from the hub axis X.

The circumferential extension of the abutment surface 17 is equal to the circumferential extension of the insertion opening 58 of the stop area 56.

In other words, when the protuberance 16 is engaged in a stop area 56, the circumferentially opposite side walls 18 of the protuberance 16 are in contact with the shoulders 59 of the stop area 56.

By selecting the stop area 56 that each protuberance must engage, it is possible to select the axial position that the brake disc 11 must assume with respect to the hub body 50 and, therefore, with respect to the frame 100 and to the brake calipers 102.

In the seventh embodiment, the protuberances 16 project radially in the opening 15 of the brake disc 11, as shown in FIG. 21.

The protuberances 16 extend axially inside the opening 15 of the brake disc 11.

The protuberances have an axial dimension smaller than the axial thickness of the opening 15, so as to be axially contained in the opening 15 itself.

The shoulders 59 of the stop areas 56 have an axial extension such as to also extend inside the opening 15 of the brake disc 11 when the brake disc 11 is mounted on the hub body 50.

In this way, when the protuberances 16 are engaged in the stop areas 56, the brake disc 11 is prevented from rotating with respect to the hub body 50, transferring the braking action exerted on the brake track 12 to the hub body 50 and thus to the wheel.

In this embodiment, the diameter of the connection portion 54 of the hub body 50 at the radial end 53 of the hub body 50 is less than the diameter of the opening 15 of the brake disc 11.

The diameter of the connection portion 54 of the hub body 50 increased by the radial extension of the stop walls 57 of the stop areas is substantially equal to the diameter of the opening 15 of the brake disc 11.

In all of the embodiments, a lock nut 70 can be screwed to the axial end of the hub body 50. The axial end of the hub body 50 is threaded to engageably receive the lock nut 70, which is also threaded.

The lock nut 70, when screwed onto the hub body 50, contacts the brake disc 11 locking it axially and preventing movements thereof in the axially outer direction.

Of course, those skilled in the art can bring numerous modification and variants to the bicycle brake disc assembly of the present invention in order to satisfy specific and contingent requirements, all of which are in any case encompassed by the scope of protection defined by the following claims.

What is claimed is:

1. A bicycle brake disc assembly comprising a brake disc and a hub body comprising a connection portion to said brake disc, wherein said hub body comprises a radially outer portion provided with a plurality of outmost and innermost stop areas, said brake disc comprising a central portion equipped with an opening to at least partially receive said connection portion of the hub body and to secure in rotation said brake disc to said hub body, said brake disc further comprising at least one protuberance configured to selectively contact one of said plurality of outmost and innermost stop areas of the hub body, said brake disc comprising a central portion equipped with an opening to at least partially receive said connection portion of the hub body and to secure in rotation said brake disc to said hub body, and an axial distance between the plurality of outmost and innermost stop areas is between 0.025 mm and 2.000 mm.

2. The brake disc assembly according to claim 1, wherein said at least one protuberance comprises a plurality of protuberances circumferentially aligned and said plurality of outmost and innermost stop areas being are circumferentially aligned.

3. The brake disc assembly according to claim 2, wherein an angular distance between two identical stop areas belonging to two circumferentially adjacent pluralities of stop areas of the plurality of outmost and innermost stop areas is equal to an angular distance between two circumferentially adjacent protuberances of the plurality of protuberances.

4. The brake disc assembly according to claim 3, wherein said plurality of protuberances have identical dimensions in an axial direction.

5. The brake disc assembly according to any of claim 3, wherein said plurality of protuberances have identical dimensions in a circumferential direction.

6. The brake disc assembly according to claim 2, wherein said plurality of protuberances have identical dimensions in an axial direction.

7. The brake disc assembly according to any of claim 6, wherein said plurality of protuberances have identical dimensions in a circumferential direction.

8. The brake disc assembly according to any of claim 2, wherein said plurality of protuberances have identical dimensions in a circumferential direction.

9. The brake disc assembly according to claim 2,
wherein each stop area of the plurality of outmost and innermost stop areas comprises an insertion opening for a selected protuberance of the plurality of said protuberances, at least one shoulder directed axially and a stop wall configured to be contacted by the plurality of protuberances of the brake disc, said stop walls of each stop area of the plurality of outmost and innermost stop areas being arranged in succession forming a single inclined plane and said plurality of protuberances of the brake disc comprising an axial end countershaped to said single inclined plane.

10. The brake disc assembly according to claim 9, wherein each stop area of the plurality of outmost and innermost stop areas comprises two shoulders that extend between said insertion opening and said stop wall, said two shoulders being parallel to one another and circumferentially spaced by a distance equal to a circumferential extension of a selected one of the plurality of protuberances configured to engage the stop area or being circumferentially spaced by a distance equal to a circumferential extension of the plurality of outmost and innermost stop areas.

11. The brake disc assembly according to claim 10, wherein said plurality of protuberances of the brake disc project radially inside said opening of the central portion; said shoulders extending axially for a distance at least equal to the axial dimension of the central portion of the brake disc.

12. The brake disc assembly according to claim 9, wherein the stop walls of each stop area of the plurality of outmost and innermost stop areas are arranged along different circumferential planes that are parallel to each other.

13. The brake disc assembly according to claim 9, wherein said plurality of protuberances are arranged radially outside of said opening of the central portion.

14. The brake disc assembly according to claim 13, wherein said hub body comprises a plurality of protrusions interspersed with a plurality of grooves that extend axially outside and radially inside said plurality of outmost and innermost stop areas; said opening of the central portion of the brake disc comprising a plurality of protrusions and grooves matching said plurality of protrusions and grooves of said hub body.

15. The brake disc assembly according to claim 1, wherein said protuberances project axially from said central portion of the brake disc towards said plurality of outmost and innermost stop areas.

16. A bicycle hub body comprising a portion configured for connection to a bicycle brake disc, said connection portion having a radially outer portion provided with a plurality of stop areas arranged as outmost stop areas and innermost stop areas configured to be selectively contacted by at least one protuberance of said brake disc, the plurality of stop areas are arranged axially at varying distances from an axial end of the hub body so that a relative axial position between the brake disc and the hub body depends upon contact between the at least one protuberance and a selected one of the plurality of stop areas, wherein a difference in axial distance between an axially outmost stop area and an axially innermost stop area of the plurality of stop areas is comprised between 0.025 mm and 2.000 mm.

17. A bicycle brake disc assembly comprising a brake disc and a hub body, wherein said hub body comprises a radially outer portion provided with a plurality of stop areas arranged at different axial distances from an axial end of the hub body, said brake disc comprises a plurality of circumferential protuberances and said hub body comprises a plurality of stop areas for selectively contacting the plurality of circumferential protuberances, each stop area of the plurality of stop areas comprises a stop wall configured for contact with said plurality of protuberances of said brake disc, said brake disc including a central portion equipped with an opening to at least partially receive a connection portion of said hub body and to secure said brake disc to said hub body, and said stop wall of each stop area of the plurality of stop areas are arranged along different circumferential planes that are parallel to each other; and, wherein the different axial distances from the axial end are in a range between 0.025 mm and 2.000 mm.

\* \* \* \* \*